US010252435B2

(12) United States Patent
Nakamura et al.

(10) Patent No.: US 10,252,435 B2
(45) Date of Patent: Apr. 9, 2019

(54) CUTTING APPARATUS, DISPLAY CONTROL DEVICE, AND NON-TRANSITORY COMPUTER READABLE STORING MEDIUM

(71) Applicant: BROTHER KOGYO KABUSHIKI KAISHA, Nagoya-shi, Aichi-ken (JP)

(72) Inventors: Yoshinori Nakamura, Toyohashi (JP); Manami Ota, Nagoya (JP); Kentaro Sugiyama, Gifu (JP); Hideaki Nagasaka, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 452 days.

(21) Appl. No.: 14/868,860

(22) Filed: Sep. 29, 2015

(65) Prior Publication Data

US 2016/0092092 A1 Mar. 31, 2016

(30) Foreign Application Priority Data

Sep. 30, 2014 (JP) ................................. 2014-199964

(51) Int. Cl.

| | |
|---|---|
| ***G06F 3/048*** | (2013.01) |
| ***B26D 5/00*** | (2006.01) |
| ***B26F 1/38*** | (2006.01) |
| *G06F 3/01* | (2006.01) |

(52) U.S. Cl.
CPC ............. *B26D 5/005* (2013.01); *B26D 5/007* (2013.01); *B26F 1/3806* (2013.01); *B26D 2005/002* (2013.01)

(58) Field of Classification Search
CPC ....... B26D 5/005; B26D 5/007; B26F 1/3806; G06F 8/34; G06F 3/0481; G05B 19/0426
See application file for complete search history.

(56) References Cited

U.S. PATENT DOCUMENTS

| | | | | |
|---|---|---|---|---|
| 7,916,346 B2 * | 3/2011 | Matsuzaki | G06K 15/02 | 347/19 |
| 8,296,648 B2 * | 10/2012 | Tirrella | G06F 11/2069 | 715/234 |
| 8,453,253 B2 * | 5/2013 | Strong | B26D 5/00 | 726/2 |
| 2003/0012454 A1 * | 1/2003 | Manico | H04N 1/3872 | 382/282 |
| 2007/0227332 A1 * | 10/2007 | Causse | B26D 7/015 | 83/879 |

(Continued)

FOREIGN PATENT DOCUMENTS

| | | |
|---|---|---|
| JP | H01-250465 A | 10/1989 |
| JP | H11-57262 A | 3/1999 |

(Continued)

*Primary Examiner* — Nicholas Augustine
(74) *Attorney, Agent, or Firm* — K&L Gates LLP

(57) ABSTRACT

A cutting apparatus includes a storing unit configured to store data of a pattern having plural parts of different colors or designs; a display unit; and a control device. The control device is configured to: acquire data of a color or a design of at least one workpiece; change a color or a design of at least one part of a pattern in the data stored in the storing unit to the color or the design acquired for the at least one workpiece; and display the pattern having the at least one part in which the color or the design has been changed on the display unit.

19 Claims, 18 Drawing Sheets

(56) References Cited

U.S. PATENT DOCUMENTS

| | | | | |
|---|---|---|---|---|
| 2010/0119282 | A1* | 5/2010 | Olsen | B41J 3/407 400/621 |
| 2010/0217427 | A1* | 8/2010 | Gray | B26D 5/00 700/117 |
| 2010/0217719 | A1* | 8/2010 | Olsen | B26D 5/00 705/318 |
| 2013/0321876 | A1* | 12/2013 | Nagai | H04N 1/00557 358/461 |
| 2013/0321877 | A1* | 12/2013 | Nagai | H04N 1/00557 358/461 |
| 2014/0182431 | A1* | 7/2014 | Hasegawa | B26F 1/3813 83/72 |
| 2014/0260854 | A1* | 9/2014 | Tokura | B26F 1/3813 83/76.1 |
| 2014/0283662 | A1* | 9/2014 | Tokura | B26D 5/007 83/76.1 |
| 2014/0290507 | A1* | 10/2014 | Tokura | B26D 5/34 101/26 |
| 2014/0293376 | A1* | 10/2014 | Tokura | H04N 1/00795 358/498 |
| 2015/0258699 | A1* | 9/2015 | Vander Woude | B26D 5/20 83/13 |

FOREIGN PATENT DOCUMENTS

| | | |
|---|---|---|
| JP | 2014-050632 A | 3/2014 |
| JP | 2014-083599 A | 5/2014 |

* cited by examiner

CUTTING APPARATUS, DISPLAY CONTROL DEVICE, AND NON-TRANSITORY COMPUTER READABLE STORING MEDIUM

CROSS-REFERENCE TO RELATED APPLICATION

This application is based upon and claims the benefit of priority from the prior Japanese Patent Application 2014-199964, filed on, Sep. 30, 2014, the entire contents of which are incorporated herein by reference.

FIELD

The disclosure relates to a cutting apparatus, a display control device, and a non-transitory computer readable storing medium.

BACKGROUND

Conventionally, there has been provided an automatic cutting apparatus configured to capture an image of a single workpiece placed on a table and matching the design of the workpiece to each of the multiple parts of a pattern. The automatic cutting apparatus is provided with a video camera for example and a monitor. The video camera captures a video of a single cloth placed on a cutting table. The monitor displays the video of the cloth and each of the parts of a pattern. The user is to rotate or move each of the parts to match the design of the cloth. Thus, the user is allowed to layout each of the parts to appropriate locations on the cloth.

The above described cutting apparatus is capable of match multiple parts to a single cloth shot by a video camera. However, it is not possible to change the different colors or designs of each of the multiple parts to match the different colors or designs of multiple cloths. Thus, it is not possible to display a single pattern in which colors or the designs of the multiple parts are changed to the different colors or the design of the multiple cloths. It has thus, been difficult for the user to know the accurate combination of colors and the designs of multiple parts before the cutting operation.

SUMMARY

Aspects described herein provide a cutting apparatus, a display control device, and a non-transitory computer readable storing medium capable of displaying multiple parts changed to the colors and the designs of multiple workpieces before a workpiece is cut.

According to aspects of the disclosure, a cutting apparatus includes a storing unit configured to store data of a pattern having plural parts of different colors or designs; a display unit; and a control device. The control device is configured to: acquire data of a color or a design of at least one workpiece; change a color or a design of at least one part of a pattern in the data stored in the storing unit to the color or the design acquired for the at least one workpiece; and display the pattern having the at least one part in which the color or the design has been changed on the display unit.

BRIEF DESCRIPTION OF THE DRAWINGS

Aspects of the disclosure are illustrated by way of example, and not by limitation, in the accompanying figures in which like reference characters may indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments will be described with reference to the accompanying drawings.

[Structure of Cutting Apparatus 1]

Figure 1:
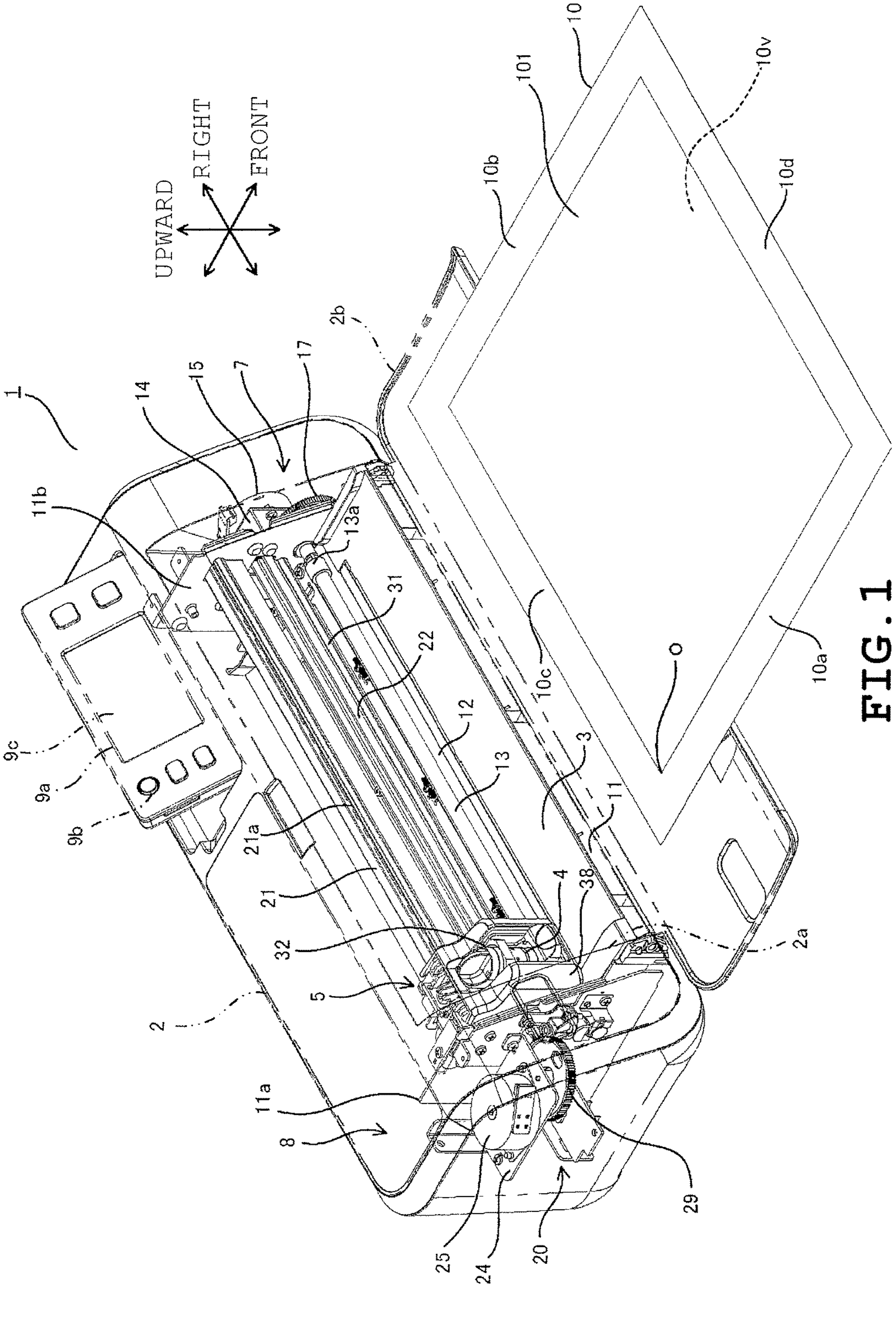
FIG. 1 is a perspective view illustrating the internal structure of a cutting apparatus 1 with a body 2 of the cutting apparatus 1.

Referring to FIG. 1, a description will be given on the structure of the cutting apparatus 1 of the present embodiment. The cutting apparatus 1 is configured to cut a workpiece 101. The cutting apparatus 1 is provided with a body 2, a platen 3, a machine frame 11, a cut head 5, a feed mechanism 7, a transfer mechanism 8, a display 9*a*, and switches 9*b*.

The feed mechanism 7 is configured to feed a holding sheet 10 set on the platen 3 in a predetermined feed direction. The transfer mechanism 8 transfers the cut head 5 in a direction crossing the direction in which the holding sheet 10 is fed. For example, the cut head 5 may be transferred in a direction orthogonal to the direction in which the holding sheet 10 is fed. In the present embodiment, forward and rearward direction in which the feed mechanism 7 is fed is defined as the Y direction. The left and right direction in which the transfer mechanism 8 is transferred is defined as the X direction. The up and down direction orthogonal to the front and rear direction and the left and right direction is defined as the Z direction. The feed mechanism 7 and the transfer mechanism 8 serve as a transfer unit 20 configured to relatively transfer the holding sheet 10 holding the workpiece 101 and the cut head 5 in the X and Y directions. That is, the transfer unit 20 is configured to be capable of moving a cutting blade 6 and the workpiece 101 so that the cutting blade 6 cuts parts of patterns from the workpiece 101.

The body 2 is shaped like a laterally elongate rectangular box. A front opening 2*a* is formed into the front face of the body 2. A front cover 2*b* configured to open and close the front opening 2*a* is provided at the front face of the body 2. The holding sheet 10 holding the workpiece 101 is set on the platen 3 by the user with the front opening 2*a* opened. A later described cartridge 4 may be detachably attached to a cartridge holder 32 of the cut head 5 by the user.

The machine frame 11 is attached to the body 2. The machine frame 11 is provided with sidewalls 11*a* and 11*b*. The sidewalls 11*a* and 11*b* are located on the left and right sides of the platen 3.

The display 9*a* is provided on the right side portion of the upper surface of the body 2. The display 9*a* is a liquid crystal color display capable of displaying in full color. Switches 9*b* allowing user operation are provided around the display 9*a*. A touch panel 9*c* is provided on the surface of the display 9*a*. The display 9*a* presents information pertaining to pattern cutting such as images of various patterns and messages, etc. that need to be informed to the user. The user is allowed to select a pattern and parts of patterns from the choice of patterns and parts presented on the display 9*a*, select various processing modes, set various parameters, and make various inputs by operating the switches 9*b* and the touch panel 9*c*.

When the workpiece 101 is being cut by the cutting apparatus 1, the platen 3 is located under the holding sheet 10. The upper surface portion of the platen 3 includes a horizontal surface. The holding sheet 10 holding the workpiece 101 is fed over the platen 3.

The holding sheet is made of a synthetic resin material for example and is shaped like a rectangular sheet. The holding sheet 10 is configured to hold the workpiece 101. An adhesive layer 10*v* is formed on area of the upper surface of the holding sheet 10 surrounded by edge portions 10*a*, 10*b*, 10*c*, and 10*d*. The adhesive layer 10*v* is formed for example by applying an adhesive coating on the holding sheet 10. The holding sheet 10 is configured to hold the workpiece 101 by allowing the workpiece 101 to stick on the adhesive layer 10*v*. The adhesive force of the adhesive layer 10*v* is controlled to a level that reliably holds the workpiece 101 unremovably during the cutting operation by a cutting blade 6 of the cartridge 4 while allowing the workpiece 101 to peel relatively easily after the cutting operation has been completed. The size of the workpiece 101 is substantially the same as the size of the region in which the adhesive layer 10*v* is formed. The size of the region which may be cut by the cutting apparatus 1 is substantially the same as the size of the workpiece 101. Further, examples of workpiece 101 include materials such as paper and cloth.

[Explanation of Feed Mechanism 7]

Figure 2:
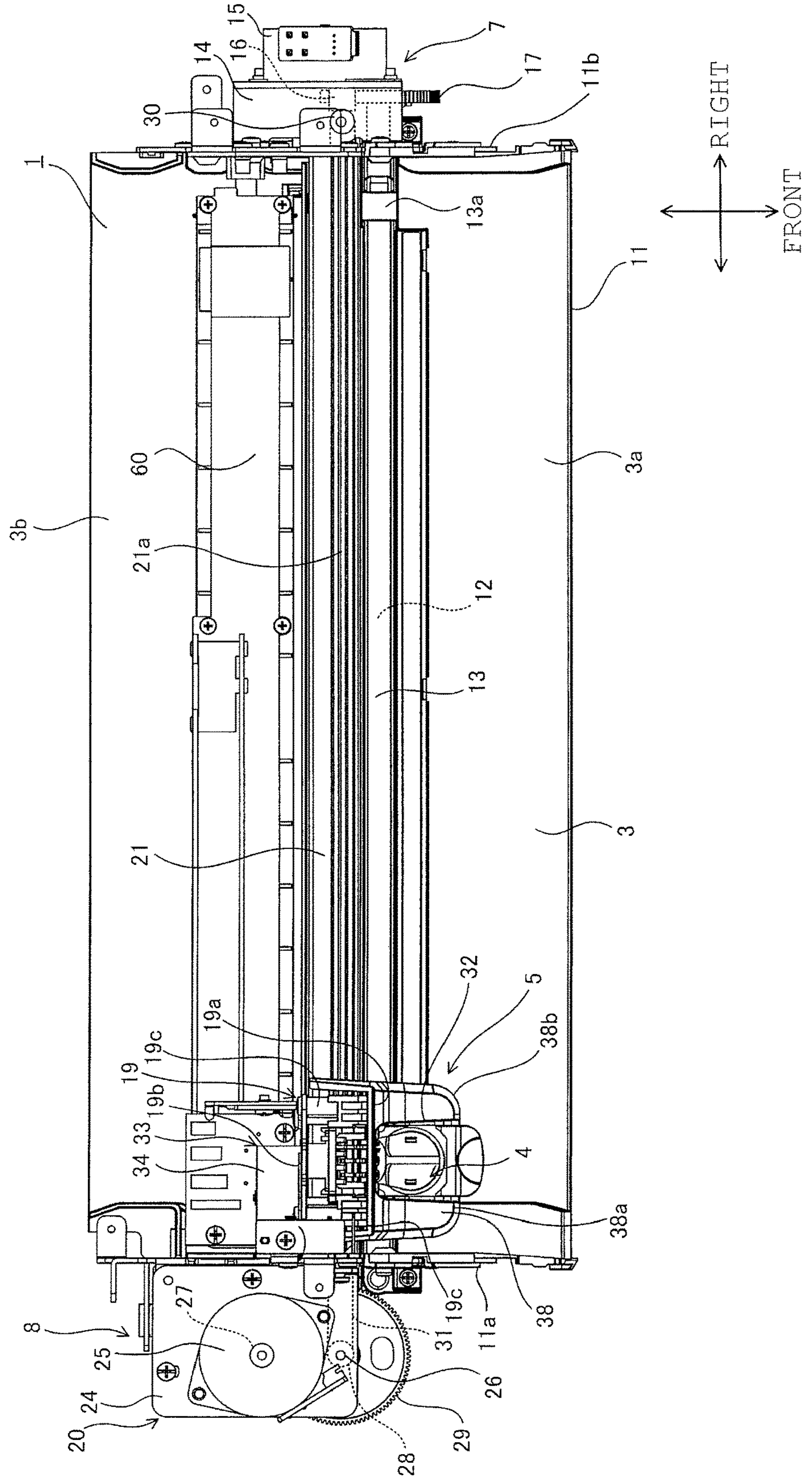
FIG. 2 is a plan view illustrating the internal structure of the cutting apparatus 1.

The feed mechanism 7 is explained in detail hereinafter with reference to FIGS. 1 and 2. The feed mechanism 7 is provided with a drive roller 12, a pinch roller 13, a mount frame 14, a Y-axis motor 15, a drive gear, and a follower gear 17.

The drive roller 12 and the pinch roller 13 are disposed between the left and right sidewalls 11*a* and 11*b*. The drive roller 12 and the pinch roller 13 extend in the left and right direction. The pinch roller 13 and the drive roller 12 are disposed one over the other in the up and down direction. In this example, the pinch roller 13 is disposed above the drive roller 12.

The left and right end sides of the drive roller 12 are supported rotatably by the sidewalls 11*a* and 11*b*. A follower gear 17 is provided on the right end of the drive roller 12. The mount frame 14 is attached to the outer surface side of the right side wall 11*b*. The Y-axis motor 15 is mounted on the mount frame 14. The Y-axis motor 15 comprises, for example, a stepper motor. The follower gear 17 is engaged with the drive gear 16. The diameter of the drive gear 16 is less than the diameter of the follower gear 17. The drive gear 16 is provided on the output shaft of the Y-axis motor 15. The rotational drive force of the Y-axis motor 15 is transmitted to the drive roller 12 via the drive gear 16 and the follower gear 17 by the rotation of the Y-axis motor 15 to cause the rotation of the drive roller 12.

The left and right end sides of the pinch roller 13 are supported rotatably by the sidewalls 11*a* and 11*b*. The sidewalls 11*a* and 11*b* support the pinch roller 13 so as to be slightly movable in the up and down direction, i.e. the thickness-wise direction of the workpiece 101. The pinch roller 13 is provided with a roller portion 13*a*. The roller portion 13*a* is disposed on each side of the shaft of the pinch roller 13. The diameter of the shaft of the roller portion 13*a* is greater than the diameter of the shaft of the pinch roller 13. A sensor 76 (see FIG. 5) is configured to detect the insertion of the front end portion of the holding sheet 10 from the front side. Though not illustrated in detail, the sensor 76 is disposed between the roller portion 13*a* and the drive roller 12.

Thus, left and right edge portions 10*a* and 10*b* of the holding sheet 10 are held between the drive roller 12 and the roller portions 13*a* of the pinch roller 13. The feed mechanism 7 feeds the holding sheet 10 in the front and rear direction by the rotation of the drive roller 12 driven by the Y-axis motor 15 with the edge portions 10*a* and 10*b* of the holding sheet 10 held between the drive roller 12 and the roller portions 13*a*.

[Explanation of Transfer Mechanism 8]

The transfer mechanism 8 is explained in detail hereinafter with reference to FIGS. 1 and 2. The transfer mechanism 8 transfers the cut head 5 in the left and right direction crossing the direction in which the holding sheet 10 is fed. The transfer mechanism 8 is provided with components such as a carriage 19, guide shafts 21 and 22, a mount plate 24, an X-axis motor 25, a pulley shaft 26, a drive gear 27, a left-side timing pulley 28, a follower gear 29, a right-side timing pulley 30, and a timing belt 31.

The guide shafts 21 and 22 extend in the left and right direction and are disposed between the left and right sidewalls 11*a* and 11*b* so as to be located behind the pinch roller 13. A guide groove 21*a* is provided on the upper surface portion of the guide shaft 21 and on the lower surface portion of the guide shaft 22 so as to extend from the left end to the right end of each of the guide shafts 21 and 22. The carriage 19 is provided with a pair of protrusions provided one on the upper side portion and one on the lower portion. The protrusions are configured to engage with the guide grooves 21*a* from the upper side and the underside. The carriage 19 is supported slidably in the left and right direction by the guide shafts 21 and 22 through the engagement of the protrusions and the guide grooves 21*a*.

A mount plate 24 is attached to the outer surface side of the left sidewall 11*a*. A mount frame 24 is attached to the outer surface side of the right sidewall 11*b*. A pulley shaft 26 is provided rotatably in the front side of the X-axis motor 25. The pulley shaft 26 extends in the up and down direction. The drive gear 27 is fixed to the output shaft of the X-axis motor 25. The pulley shaft 26 rotatably supports the left-side timing pulley 28 and the follower gear 29. The timing pulley 28 and the follower gear 29 are structurally integral and thus, rotate as one. The follower gear 29 meshes with the drive gear 27.

The right-side timing pulley 30 is rotatably mounted on the mount frame 14. The right-side timing pulley 30 and the left-side timing pulley 28 are wound with an endless timing belt 31 which extends horizontally along the left and right direction. The intermediate portion of the timing belt 31 is connected to a rear surface portion of the carriage 19.

When the X-axis motor 25 is rotated, the rotational drive of the X-axis motor 25 is transmitted to the timing belt 31 via the drive gear 27, the follower gear 29, and the left-side timing pulley 28 to cause the carriage 19 to be moved in the left and right direction. As later described in detail, the carriage 19 is provided with the cut head 5. Thus, the movement of the carriage 19 in the left and right direction results in the movement of the cut head 5 in the left and right direction.

[Explanation of Scanner 60]

A description will be given on a scanner 60 with reference to FIG. 2. The scanner 60 is configured to optically read the color or the design of the workpiece 101. More specifically, the scanner 60 reads the images on the surface of the workpiece 101 transferred by the transfer mechanism 7. The scanner 60 may comprise a CIS (contact image sensor). Though not shown in detail, the scanner 60 includes an image capturing element and a light source. The image capturing element comprises multiple sensors aligned in the left and right direction (X direction). The scammer 60 is located behind the guide shaft 21. The width of the scanner 60 taken along the left and right direction is substantially identical to the width of the holder sheet 10 taken along the left and right direction.

The light source of the scanner 60 emits light toward the surface of the workpiece 101 held by the holding sheet 10 disposed on the platen 3. The light emitted from the light source reflects off the surface of the workpiece 101. The scanner 60 reads the image of the surface of the workpiece 101 with the contact glass placed in close proximity of the upper surface of the workpiece 101. The scanner 60 reads the image of the region in which the adhesive layer 10*v* of the holding sheet 10 is formed. The image capturing element captures images of light reflecting off of the workpiece 101.

[Explanation of Cut Head 5]

The cut head 5 is explained with reference to FIGS. 2 and 3. The cut head 5 is provided with the carriage 19, a cartridge holder 32 and an up-down drive mechanism 33. The cartridge holder 32 is disposed in the front side of the carriage 19 and the up-down drive mechanism 33 is disposed in the rear side of the carriage 19. The up-down drive mechanism 33 drives the cartridge holder 32 as well as the cartridge 4 in the up and down direction (Z direction).

The carriage 19 is provided with a front wall 19*a*, a rear wall 19*b*, upper arm 19*c*, and a lower arm 19*d*. The upper and lower arms 19*c* and 19*d* connect the front and rear walls 19*a* and 19*b*. The carriage 19 is shaped so as to surround the front and rear sides as well as the upper and lower sides of the guide shafts 21 and 22. A forwardly oriented Z-axis motor 34 is attached to the rear wall 19*b* of the carriage 19.

The up-down drive mechanism 33 is provided with a transmission mechanism and the Z-axis motor 34. The transmission mechanism is provided between the Z-axis motor 34 and the cartridge holder 32. The transmission mechanism is configured to decelerate the rotary motion of the Z-axis motor 34 and convert the rotary motion to the up and down movement of the cartridge holder 32. The transmission mechanism and the Z-axis motor 34 serve as the up-down drive mechanism 33.

When the Z-axis motor 34 is driven in the forward and reverse directions, the rotary motion of the Z-axis motor 34 is converted into the up and down movement via the transmission mechanism to cause the cartridge holder 32 as well as the cartridge 4 to be moved in the lifted position or the lowered position. As a result, the cartridge 4 held by the cartridge holder 32 is moved between the lowered position for cutting the workpiece 101 using the cutting blade 6 (indicated by a solid line in FIG. 3) and the lifted position (indicated by a double-dot chain line in FIG. 3) in which the blade tip 6*a* of the cutting blade 6 is spaced apart from the workpiece 101 by a predetermined distance.

In attaching the cartridge 4 to the cartridge holder 32, the blade tip 6*a* contacts the workpiece 101 when the cartridge 4 is in the lowered position. The pressure exerted on the blade tip 6*a* is controlled, by a control circuit 61 described hereinafter, to an appropriate pressure suitable for performing the cutting operation based on the amount of rotation of the Z-axis motor 34. The pressure exerted on the blade tip 6*a* is hereinafter referred to as the cutting pressure.

The cartridge holder 32 is provided with a holder frame 35, an upper holder 36, and a lower holder 37. The holder frame 35 is driven up and down by the up-down drive mechanism 33. The upper holder 36 and the lower holder 37 are secured to the holder frame 35. More specifically, the front wall 19*a* of the carriage 19 is provided with a cover member 38 configured to cover the left and right sides of the carriage 19 from the front side. The holder frame 35, serving as a movable portion, is provided between the right side projection 38*a* and the left side projection 38*b* of the cover member 38. The upper and lower surface as well as the front surface of the holder frame 35 are opened. The upper holder 36 and the lower holder 37 are shaped like a frame and are installed into the holder frame 35. The cartridge 4 is inserted through the upper holder 36 and the lower holder 37 from the upper side to be attached to the holder frame 35.

A lever member 40 is provided between the upper holder 36 and the lower holder 37. The lever member 40 is provided with a pair of left arm 41 and a right arm 42 and an operating portion 43 provided so as to connect the tips of the arms 41 and 42. The lever member 40 is supported swingably by the holder frame 35 with the upper end sides of the arms 41 and 42 serving as the base end. Engagement portions 41*a* and 42*a* shaped like small cylinders are provided on the inner surface sides of the arms 41 and 42, respectively. The engagement portions 41*a* and 42*a* are configured to be capable of engagement with later described engagement subject portion 54*a* provided at the carriage 4.

Figure 3:
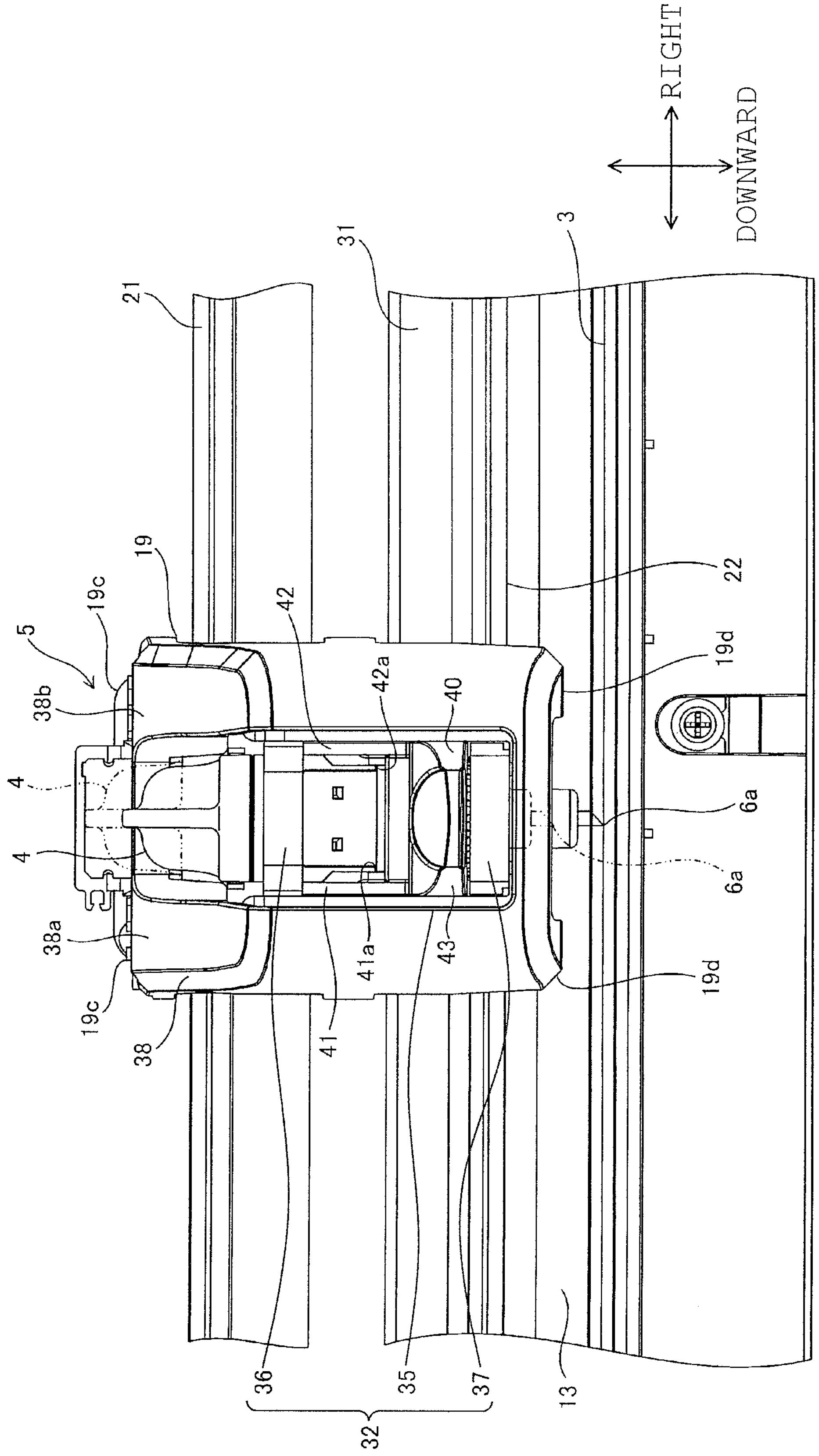
FIG. 3 is a front view illustrating the vicinity of a cut head 5.

The lever member 40 is configured to swing about the base ends of the arms 41 and 42 so as to be switchable between a locked position illustrated in FIG. 3 and an unlocked position. The lever member may be switched from the locked position to the unlocked position by pulling the operating portion 43 forward as viewed in FIG. 3. The cartridge 4 is secured to the lower holder 37 by the engagement of the engagement portions 41*a* and 42*a* with the engagement subject portion 54*a* of the cartridge 4 when the lever member 40 is in the locked position. In contrast, the lever member 40 is unlocked when the user pulls the operating portion 43 forward so as to be swung from the locked position to the unlocked position, thereby causing the engagement portions 41*a* and 42*a* to be spaced apart from the engagement subject portion 54*a*. The user is thus, allowed to readily and reliably cause attachment and detachment of the cartridge using the lever member 40.

[Explanation of Cartridge 4]

Figure 4:
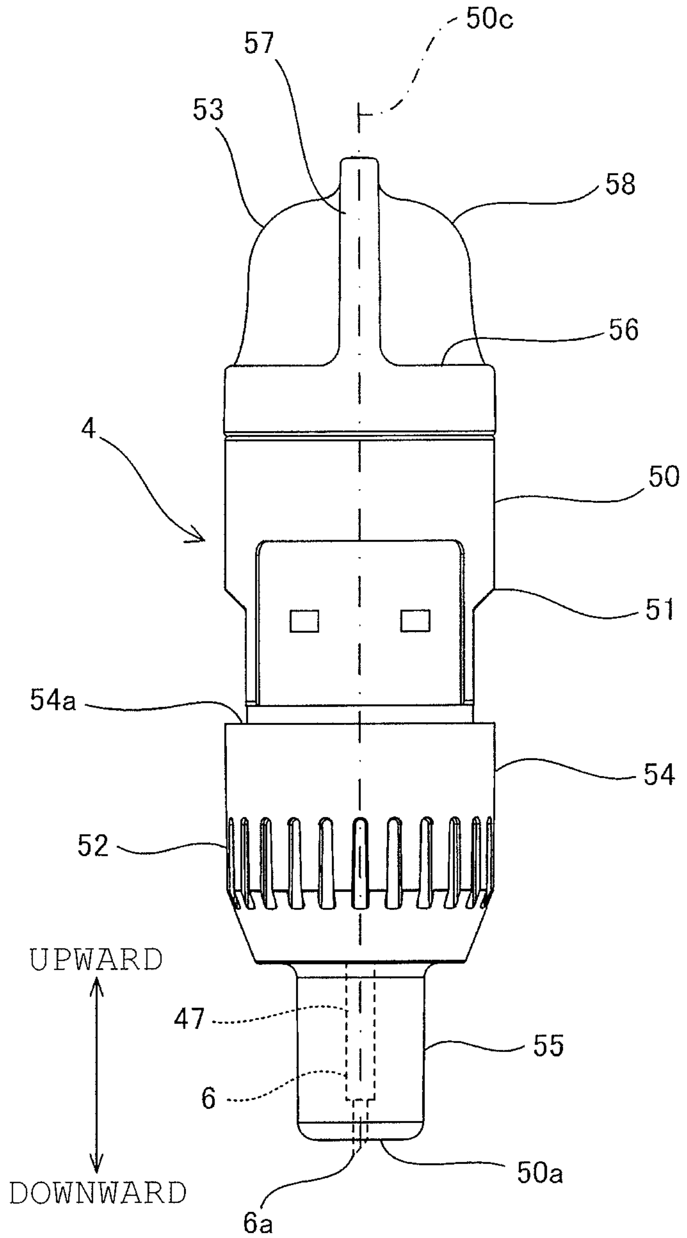
FIG. 4 is a front view of a cartridge 4.

The cutting apparatus 1 is provided with multiple cartridges 4 equipped with blades 6 suitable for the types of workpiece to be cut. The user may replace the cutting blade 6 provided to each cartridge 4. A description is given hereinafter on the cartridge 4 with reference to FIG. 4.

The cartridge 4 comprises an outer case 50. The outer case is provided with a case body 51, a cap portion 52 provided on one end of the case body 51, and a grip portion 53 provided on the other end of the case body 51. The case body 51 is shaped like a cylinder extending in the up and down direction. The cap portion 52 is provided with a large-diameter portion 54 being fitted into the lower end portion of the case body 51 and a small-diameter portion 55. Thus, the cap portion 52 is shaped like a stepped cylinder having an enclosed bottom. The engagement subject portion 54*a* is located on the upper end of the large-diameter portion 54. The engagement subject portion 54*a* is placed in contact with the engagement portions 41*a* and 42*a* of the lever member 40. The lower end of the large-diameter portion 54 establishes a fitting engagement with the lower holder 37 of the cartridge holder 32. The cap portion 52 has a planar lower surface portion 50*a* and a hole is formed on the lower surface portion 50*a* to allow the tip 6*a* of the cutting blade 6 to pass therethrough.

The grip portion 53 comprises a lid plate 56, a grip plate 57, and a rear surface plate 58 which are structurally integral. The lid plate 56 is fixed to the upper end of the case body 51. The grip plate 57 and the rear surface plate 58 are located on the upper side of the lid plate 56. The grip plate 57 is located on a lateral center of the lid plate 56 so as to be oriented in the longitudinal direction.

The cutting blade 6 comprises a cutter shaft 47 and the blade tip 6*a* which are structurally integral. The cutter shaft 47 is installed in the outer case 50 of the cartridge 4. The cutter shaft 47 occupies most of the cutting blade 6 and is shaped like a round bar. The blade tip 6*a* is located on one end of the cutting blade 6. The blade portion of the cutting blade 6 is shaped like a letter V which is slanted with respect to the workpiece 101. Further, a bearing is provided inside the case body 51. The bearing supports the cutter shaft 47 rotatably about its central axis 50*c*. The blade tip 6*a* protrudes from the lower surface portion 50*a* of the cap portion 52.

When cutting the workpiece 101, the control circuit 61 moves the cartridge 4 mounted on the cartridge holder 32 to the lowered position by the up-down drive mechanism 33 and sets the cutting pressure. When the cartridge 4 is in the lowered position, the blade tip 6*a* penetrates through the workpiece 101 placed on the holding sheet 10 and further slightly penetrates into the holding sheet 10. The workpiece 101 is cut by relatively moving the holding sheet 10 and the cutting blade 6 in the X and Y directions using the feed mechanism 7 and the transfer mechanism 8 with the cartridge 4 placed in the lowered position. In the cutting apparatus 1, an XY coordinate system is employed for example in which the origin O is set to the upper left corner of the adhesive layer 10*v* of the holding sheet 10 illustrated in FIG. 1. The workpiece 101 and the cutting blade 6 are moved in a relative manner based on the XY coordinate system.

[Electrical Configuration of Cutting Apparatus 1]

Figure 5:
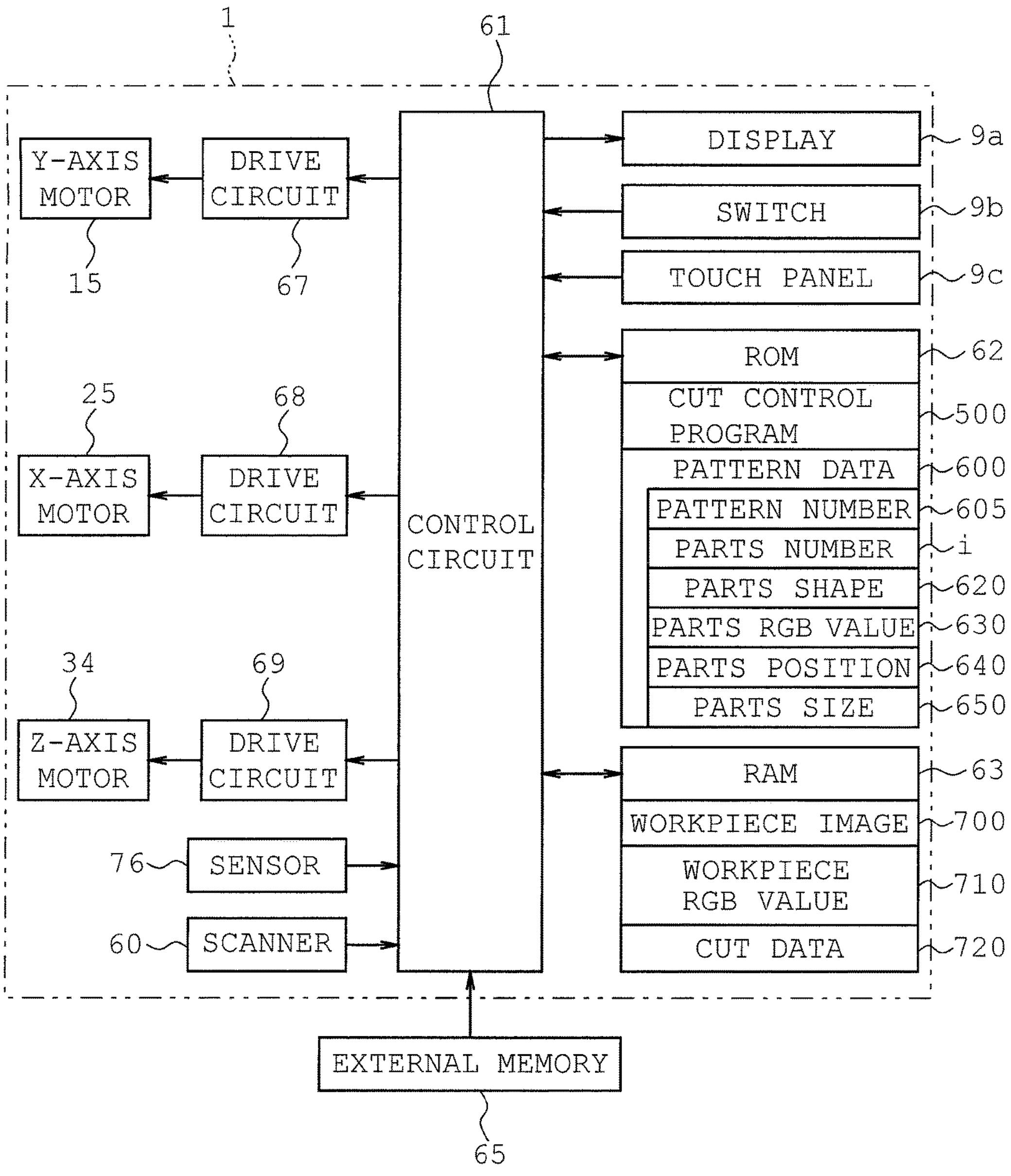
FIG. 5 is a block diagram schematically indicating an electrical configuration of the cutting apparatus 1.
Figure 6:
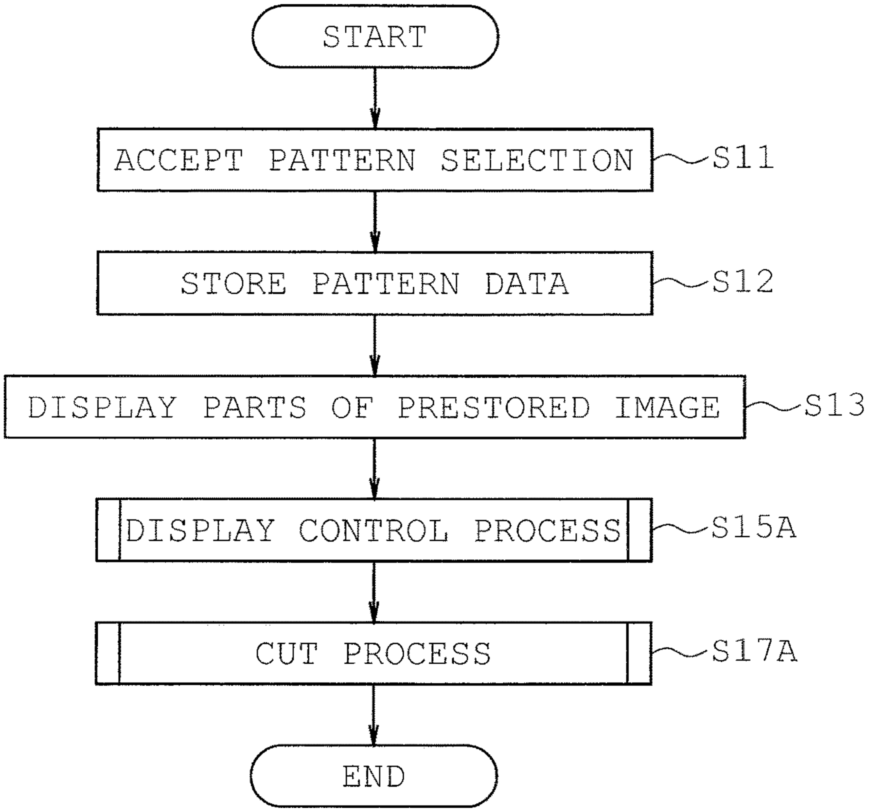
FIG. 6 is a flowchart indicating a cut control process 500.
Figure 7:
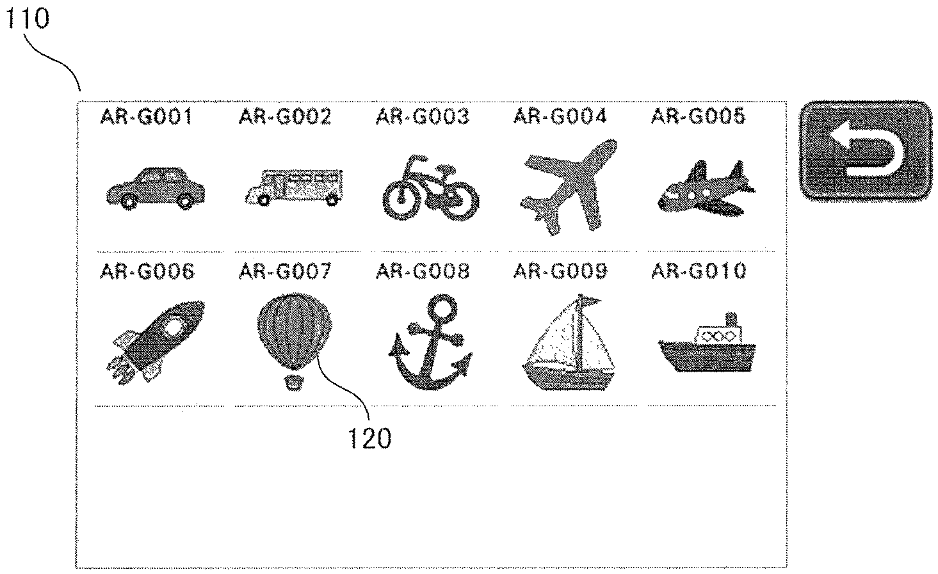
FIG. 7 illustrates a pattern selection screen 110.

Next, a description will be given on a control system of the cutting apparatus 1 with reference to FIG. 5. The control circuit 61 is responsible for the overall control of the cutting apparatus 1. The control circuit 61 is primarily configured by a computer (CPU). The control circuit 61 is electrically connected to a ROM 62, a RAM 63, and external memory 65. The ROM 62 stores items such as a cut control program 500 for controlling the cutting operation and pattern data 600. The cut control program 500 contains display control programs S15A, S15B, S15C, and S15D for controlling how information is presented on the display 9*a*. The RAM 63 stores images of workpieces 101 read by the scanner 60 and the RGB values 710 of the workpieces 101 calculated based on the images of the workpieces 101 read by the scanner 60. External memory 65 stores cut data 720 used for cutting patterns.

A pattern may be a monolithic pattern colored in a single color or a pattern formed of multiple parts colored in different colors or have different designs. When the pattern is formed of multiple parts having different colors or designs, pattern data 600 contains pattern number 605, parts number i, parts shape 620, parts RGB 630, parts location 640, and parts size 650. The details of the pattern data 600 will be later described in detail. The display 9*a* is capable of displaying both the single colored pattern and the pattern formed of multiple patterns having different colors or designs.

Signals are inputted to the control circuit 61 from switches 9*b*, etc. The control circuit 61 is electrically connected to scanner 60, sensor 76, display 9*a*, and the touch panel 9*c*. The user is allowed to select the desired patterns and various types of processing modes, and specify various parameters by operating the switches 9*b* or the touch panel 9*c* while referring to the information provided through the display 9*a*. Further, the control circuit 61 is electrically connected to drive circuits 67, 68, and 69 controlling driving a Y-axis motor 15, an X-axis motor 25, and a Z-axis motor 34, respectively. The control circuit 61 is configured to control elements such as the Y-axis motor 15, the X-axis motor 25, the Z-axis motor 34 to automatically execute a cutting operation on the workpiece 101 placed on the holding sheet 10.

[Cut Control Program 500]

Referring to FIGS. 6 to 11, a description is given on the cut control program 500. The cut control program 500 is executed by the control circuit 61 of the cutting apparatus 1. For example, when the user touches a key on the touch panel 9*c* that causes transition to the pattern selection screen 110, the control circuit 61 reads the cut control program 500 from the ROM 62 and executes the same. Upon execution of the cut control program 500, the control circuit 61 invokes the pattern selection screen 110 on the display 9*a*. Each of the steps indicated in the flowchart represents the process steps executed by the control circuit 61.

At step S11, the control circuit 61 receives user input of the selection of one or more patterns to be cut using the cut mechanism. When the user depresses a location on the touch panel 9*c* displaying the desired pattern 120 in the pattern selection screen 110 illustrated in FIG. 7 with a touch pen or the user's finger, the touch panel 9*c* detects the pattern 120 selected by the user from multiple patterns.

Then, at step S12, the control circuit 61 stores pattern data 600 of the pattern 120 selected by the user, which was stored in the ROM 62, to the RAM 63.

Figure 8:
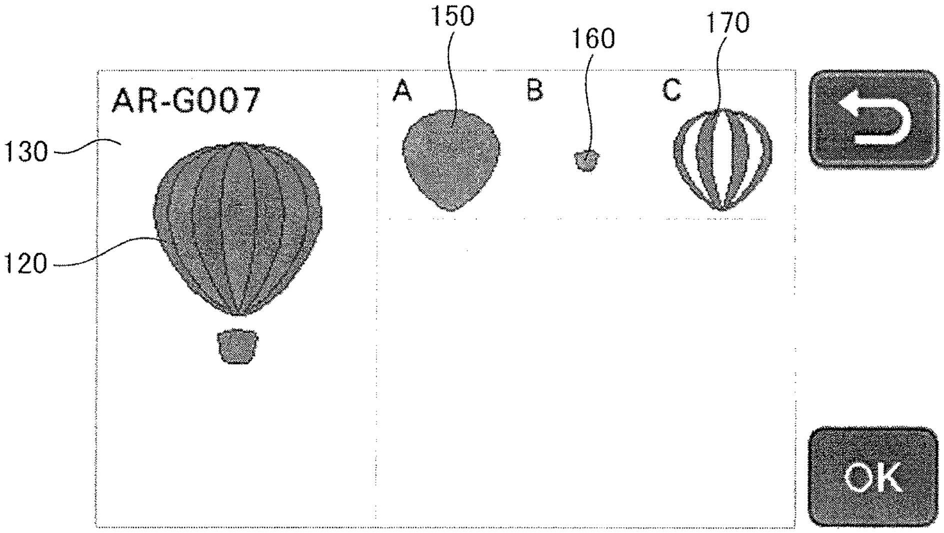
FIG. 8 illustrates a parts screen 130.

Then, at step S13, the control circuit 61 invokes a parts screen 130 presenting parts 150, 160, and 170 making up the pattern 120 on the display 9*a* as illustrated in FIG. 8.

One example of a pattern data 600 will be described with reference to FIG. 8. The pattern data 600 includes information such as a pattern number 605, parts number i, parts shape 620, and parts RGB value 630. The pattern number 605 is unique to each pattern. One example of pattern number 605 is AR-G007. Parts number i is unique to each part. The part number i is a positive integer for example. The parts shape 620 is coordinate data represented by X and Y coordinates. More specifically, coordinate data is collection of coordinates representing the shape of a pattern when the origin is located at the center of the pattern. Parts RGB value 630 is information pre-stored in the ROM 62 and represents colors of the parts. For example, RGB value (R, G, B) of part 150 is (255, 0, 0). RGB value (R, G, B) of part 160 is (255, 0, 0). RGB value (R, G, B) of part 170 is (0, 0, 255).

Next, at step S15A, the control circuit 61 executes a display control program.

Then, at step S17A, the control circuit 61 executes a cut process. The control circuit 61 terminates the cut control program 500 after completing step S17A.

[Display Control Program S15A of First Embodiment]

Figure 9:
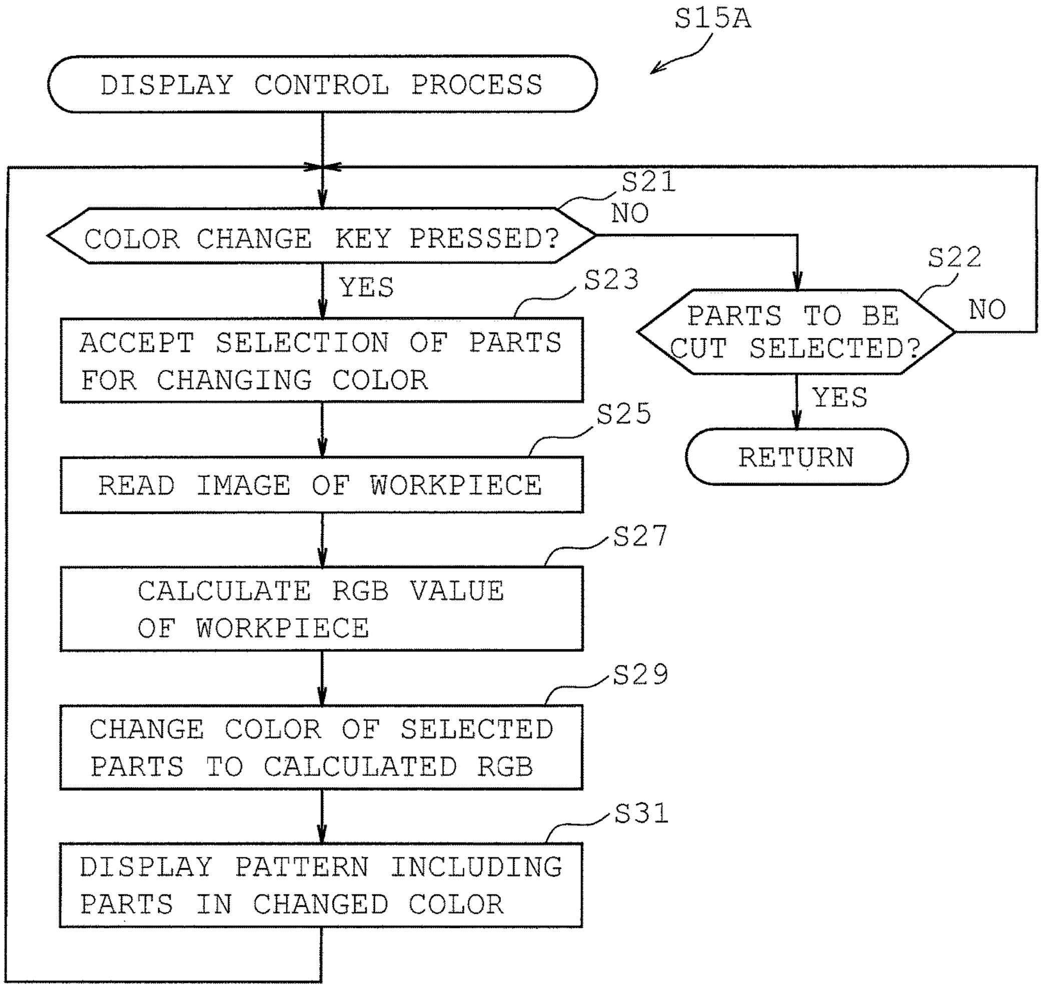
FIG. 9 is a flowchart indicating a process flow of a display control program of step S15A.
Figure 10:
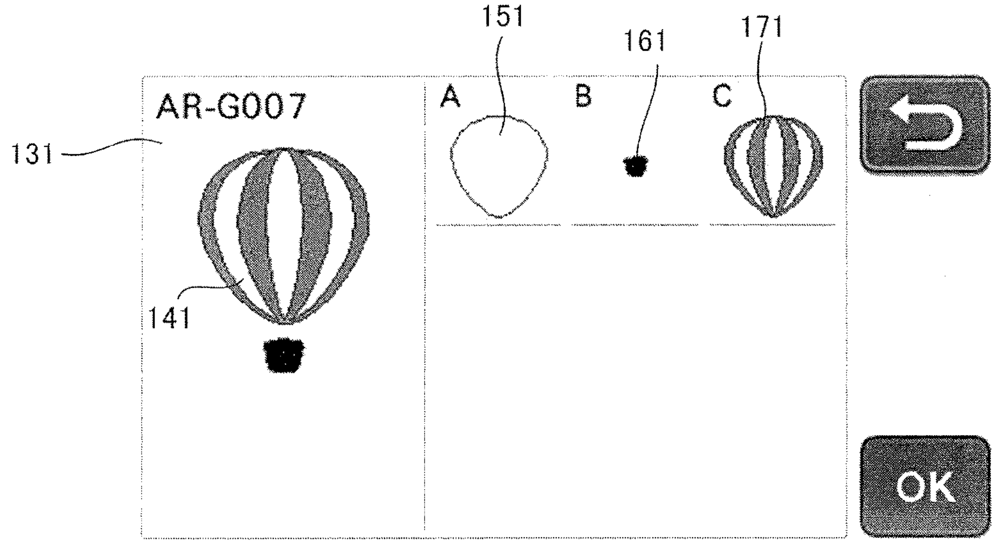
FIG. 10 illustrates a parts screen 131.

A description will be given in detail on a display control program S15A with reference to FIGS. 9 and 10. The control circuit 61 begins the display control program S15A with step S21 of FIG. 9.

At step S21, the control circuit 61 judges whether or not a color change key (not shown) has been pressed. More specifically, the control circuit 61 presents the color change key on the display 9*a*. When user has pressed the touch panel 9*c* disposed above the color change key, the touch panel 9*c* detects the pressing of the color change key. When the touch panel 9*c* has detected the pressing of the color change key, the control circuit 61 judges that the color change key has been pressed. The control circuit 61 proceeds to step S23 after judging that the color change key has been pressed (S21: YES). When the user has pressed a key on the touch panel 9*c* that is different from the color change key, the touch panel 9*c* makes a detection that the color change key has not been pressed. When the touch panel 9*c* has detected that the color change key has not been pressed, the control circuit 61 judges that the color change key has not been pressed. The control circuit 61 proceeds to step S22 after judging that the color change key has not been pressed (S21: NO).

At step S22, the control circuit 61 judges whether or not the parts to be cut have been selected. More specifically, the user is to press the parts which the user desires to cut without changing their color on the part screen 130 in order to start cutting of parts. The control circuit 61 judges that the parts have been selected when the touch panel 9*c* has detected that the parts have been pressed on the parts screen 130. The control circuit 61 terminates the process of step S15A when judging that parts have been selected on the touch panel 9*c* (S22: YES). The control circuit 61 returns the process flow back to step S21 when judging that parts have not been selected on the touch panel 9*c* (S22: NO).

At step S23, the control circuit 61 accepts selection of one part for which the color is to be changed from the multiple choice of parts. The touch panel 9*c* detects the part that the user has selected from the multiple choice of parts when the user presses the location of the touch panel 9*c* corresponding to the part on the parts screen 130 for which the color is to be changed by a touch pen or the user's finger. The control circuit 61 stores the detected part to the RAM 63.

Then, at step S25, the control circuit 61 makes the scanner 60 read an image of the color or the design of the workpiece 101. More specifically, the control circuit 61 rotates the Y-axis motor 15 in a predetermined direction through the drive circuit 67. The rotation of the Y-axis motor 15 in the predetermined direction causes rotation of the drive roller 12. The rotation of the drive roller 12 causes the holding sheet 10 carrying the workpiece 101 and being placed between the drive roller 12 and the roller portion 13*a* to be fed rearward. The scanner 60 reads an image of the workpiece 101 attached to the holding sheet 10. The control circuit 61 stores the read image of the workpiece 101 to the RAM 63. After reading the image of the workpiece 101, the control circuit 61 rotates the Y-axis motor 15 in the direction opposite of the predetermined direction through the drive circuit 67. The rotation of the Y-axis motor 15 in the opposite direction causes the drive roller 12 to rotate in a direction opposite of the direction rotated during image capturing thereby feeding the holding sheet 10 in the forward direction. The drive roller 12 returns the holding sheet 10 to the original position by feeding the holding sheet 10 forward.

Then at step S27, the control circuit 61 calculates an RGB value 710, being the color of the workpiece 101, from the image of the workpiece 101 read by the scanner 60 at step S25. More specifically, the control circuit 61 acquires analog data of the R (red) component for each pixel of the image of the workpiece 101 read by the scanner 60. The control circuit 61 converts, pixel by pixel, the analog data to digital data (or a gradation data) ranging from 0 to 255 by AD conversion. The control circuit 61 calculates an average value of the digital data of the converted pixels for the R component. More specifically, the control circuit 61 calculates the average value of the multiple pixels by dividing the sum of the digital data of the converted pixels by the number of pixels read. The control circuit 61 performs the same processes for the G (green) component and the B (blue) component. The control circuit 61 calculates the RGB value of the workpiece 101 based on the average value of digital data for all of the pixels belonging to each of the RGB components. One example of the RGB value 710 calculated for the workpiece 101 is (128, 0, 0). The control circuit 61 stores the RGB value 710 of the workpiece 101 into the RAM 63.

Then, at step S29, the control circuit 61 is converts the color of the part selected at S23 into the RGB value calculated at step S27. More specifically, the control circuit 61 converts the RGB value 630 of the part pre-stored in ROM 62 into the RGB value 710 of the workpiece read by the scanner 60. The control circuit 61 assigns the RGB value 710 into the RGB value 630. For example, the RGB value 710 (128, 0, 0) of the workpiece 101 is assigned to the RGB value 630 (255, 0, 0) of part 150 illustrated in FIG. 8. As a result, the RGB value of the part 150 is changed to (128, 0, 0). Further, the RGB value 710 (255, 255, 255) of a workpiece different from the workpiece 101 is assigned to an RGB value (255, 0, 0) of part 160. As a result, the RGB value of the part 160 is changed to (255, 255, 255).

Next, at step S31, the control circuit 61 displays the selected pattern on the display 9*a* with multiple parts colored in the colors changed at step S29. More specifically, the control circuit 61 displays the parts screen 131 on the display 9*a* in the changed color as illustrated in FIG. 10. In this example, the display 9*a* displays part 151 changed to a bright color represented by RGB value 630 (128, 0, 0) and part 161 in a dark color represented by RGB value (255, 255, 255). After completing step S31, the control circuit 61 returns the process flow back to step S21.

Figure 11:
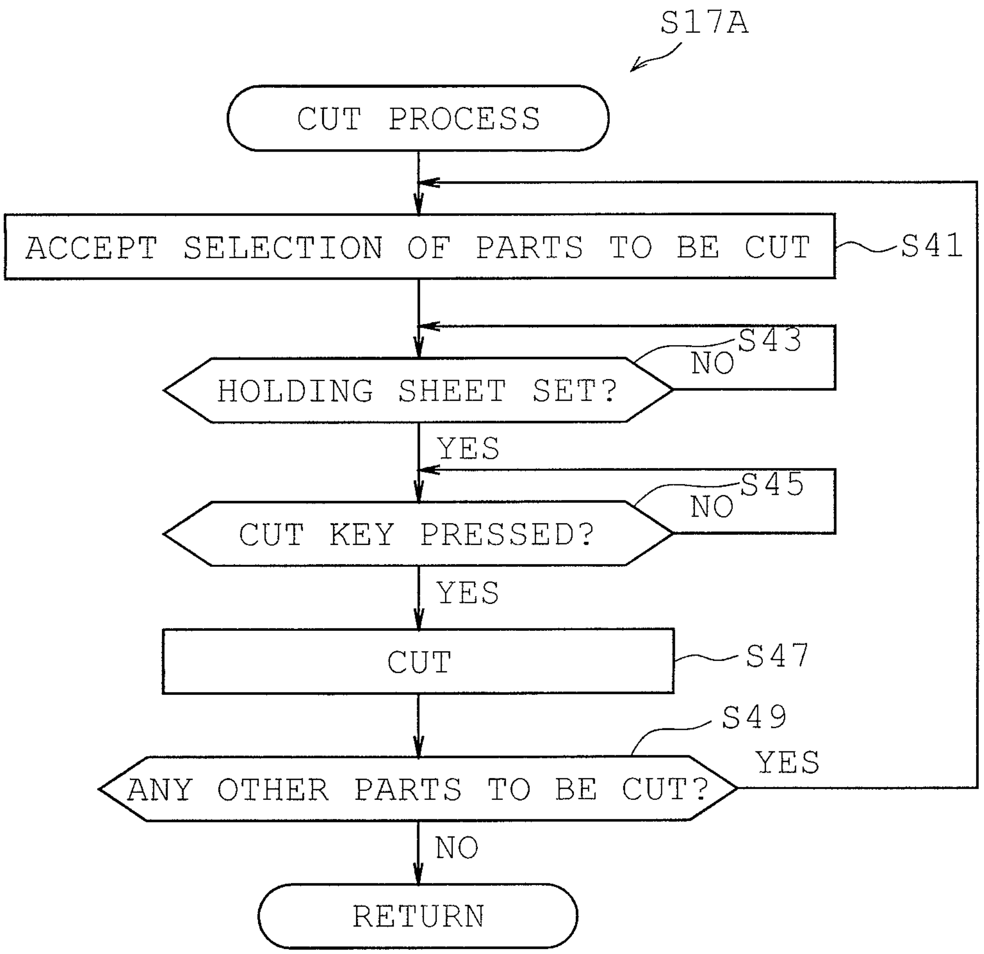
FIG. 11 is a flowchart indicating a process flow of a cut process of step S17A.

Next, as illustrated in FIG. 11, a description will be given in detail on cut process S17A. The control circuit 61 begins the process S17A with step S43 of FIG. 11.

The control circuit 61 accepts specification of parts size after the parts have been selected. The control circuit 61 stores parts size 650 specified by the user in the RAM 63.

At step S43, the control circuit 61 judges whether or not the holding sheet 10 has been set. More specifically, the sensor 76, when detecting that the holding sheet 10 has been set, sends a detection signal to the control circuit 61. The control circuit 61 judges that the holding sheet 10 has been set upon receiving the detection signal. The control circuit 61 proceeds to step S45 when judging that the holding sheet 10 has been set (S43: YES). The control circuit 61 repeats step S43 when judging that holding sheet 10 has not been set (S43: NO).

At step S45, the control circuit 61 displays a cut key (not illustrated) on the display 9*a* which instructs execution of cutting and judges whether or not the cut key has been pressed. The control circuit 61 proceeds to step S47 when judging that the cut key has been pressed (S45: YES). The control circuit 61 repeats step S45 when judging that the cut has not been pressed (S45: NO).

At step S47, the control circuit 61 controls the drive of the transfer unit 20 so as to cut the parts selected at step S41. More specifically, the control circuit 61 acquires the center coordinate of the pattern based on the location of the pattern specified by the user on the touch panel 9*c*. The control circuit 61 generates coordinate data indicated where the cuts are to be made based on the center coordinate of the pattern as well as the parts shape 620 and the parts size 650 provided in the pattern data 600. The coordinate data establishes its origin O at the upper left corner of the holding sheet 10. More specifically, the control circuit 61 converts the coordinate data provided in the pattern data 600 into coordinate data plotted on the holding sheet 10 so that the origin of the coordinate data of the pattern data 600 and the central coordinate of the selected pattern coincide. The control circuit 61 stores the generated data in the RAM 63 as cut data 720. The control circuit 61 controls the drive of the transfer unit 20 so that the blade tip 6*a* moves along the coordinates defined in the cut data 720.

Then, at step S49, the control circuit 61 judges whether there are any other parts to be cut. Though not illustrated, the control circuit 61 displays a "NEXT PART" key and an "END" key on the display 9*a*. The control circuit 61 returns the process flow back to S41 when detecting that the "NEXT PART" key has been pressed (S49: YES) on the touch panel 9*c*. The control circuit 61 terminates the cut process S17A when detecting that the "END" key has been pressed on the touch panel 9*c* (S49: NO). The control circuit 61 terminates the cut control program 500 after terminating the cut process S17A.

Effects of First Embodiment

At step S29, the control circuit 61 converts the color of the selected parts into the color read by the scanner 60. The control circuit 61 displays the pattern on the display 9*a* with the parts colored in the changed colors. Thus, the user is allowed to display the desired parts of the selected pattern in the color of the workpiece 101 available to the user. Thus, the user is allowed to be aware of the how the combination of parts colored in the color of the workpiece 101 would look prior to the execution of pattern cutting.

[Display Control Program S15B of Second Embodiment]

Figure 12:
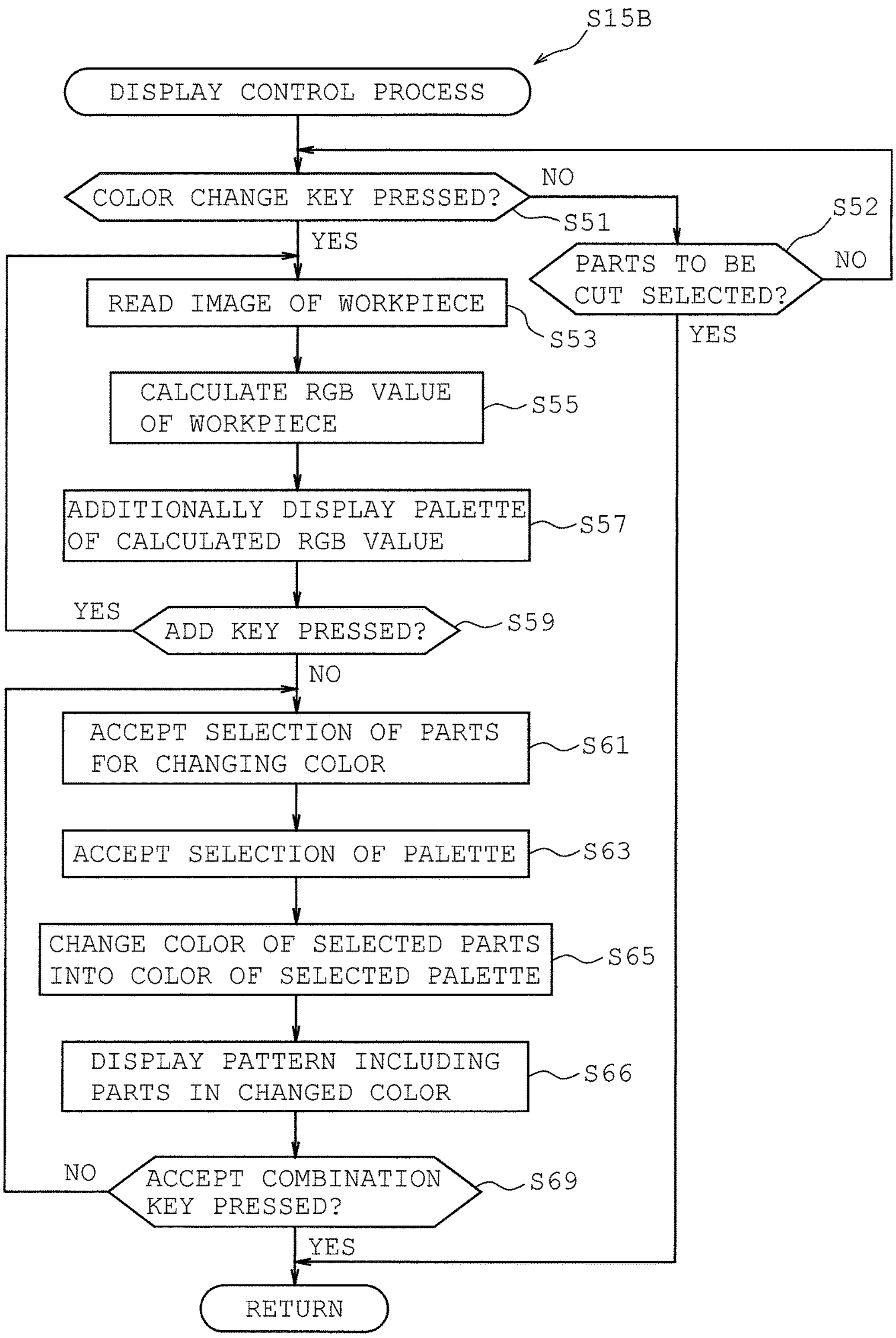
FIG. 12 is a flowchart indicating a process flow of the display control program of step S15B.

A description will be given on the configuration of a display control program S15B of the second embodiment with reference to FIGS. 12 and 13. The second embodiment differs from the first embodiment in that the display control program S15B is provided instead of display control program S15A as illustrated in FIG. 12. The control circuit 61 begins the display control program S15B with step S51 indicated in FIG. 12.

At step S51, the control circuit 61 determines whether or not the color change key has been pressed as was the case in step S21. More specifically, the control circuit 61 displays the color change key on the display 9*a*. When user has pressed the touch panel 9*c* disposed above the color change key, the touch panel 9*c* detects the pressing of the color change key. When the touch panel 9*c* has detected the pressing of the color change key, the control circuit 61 judges that the color change key has been pressed. The control circuit 61 proceeds to step S53 after judging that the color change key has been pressed (S51: YES). When the user has pressed a key on the touch panel 9*c* that is different from the color change key, the touch panel 9*c* makes a detection that the color change key has not been pressed. When the touch panel 9*c* has detected that the color change key has not been pressed, the control circuit 61 judges that the color change key has not been pressed. The control circuit 61 proceeds to step S52 after judging that the color change key has not been pressed (S51: NO).

At step S52, the control circuit 61 judges whether or not the parts to be cut have been selected as was the case in step S22. More specifically, the user is to press the parts which the user desires to cut without changing their color on the parts screen 130 in order to start cutting of parts. The control circuit 61 judges that the parts have been selected when the touch panel 9*c* has detected that the parts have been pressed on the parts screen 130. The control circuit 61 terminates the process of step S15B when judging that parts have been selected on the touch panel 9*c* (S52: YES). The control circuit 61 returns the process flow back to step S51 when judging that parts have not been selected on the touch panel 9*c* (S52: NO).

Then, at step S53, the control circuit 61 makes the scanner 60 read an image of the workpiece 101 as was the case in step S25.

At step S55, the control circuit 61 calculates an RGB value, being the color of the workpiece 101, from the image of the workpiece 101 read by the scanner 60 at step S53 as was the case in step S27.

Figure 13:
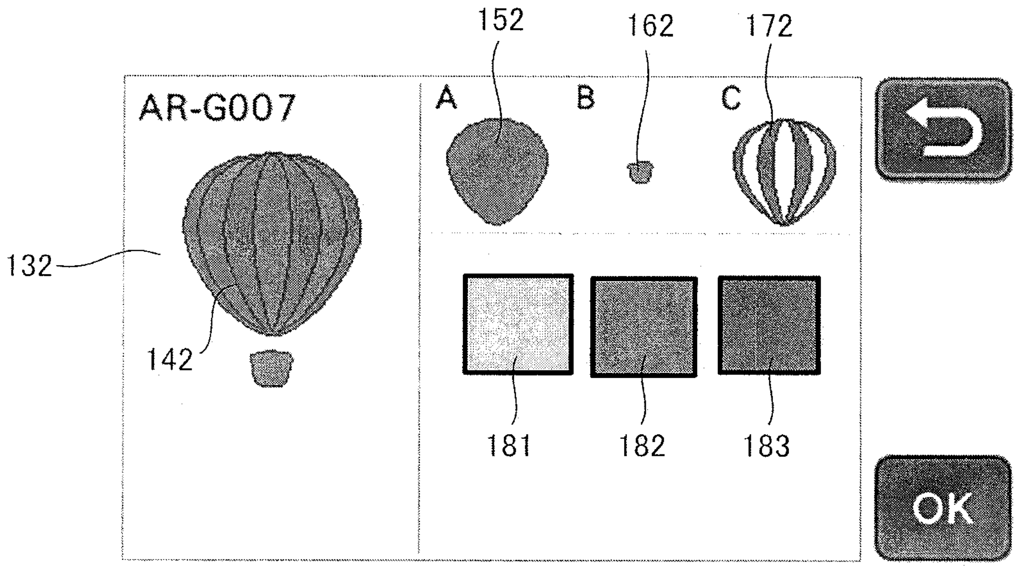
FIG. 13 is a parts screen 132 containing palettes 181, 182, and 183.

Then, at step S57, the control circuit 61 displays a parts screen 132 in which palettes 181, 182, and 183 of the RGB values calculated at S55 as illustrated in FIG. 13. A palette represents a color of the workpiece 101 read by the scanner 60 and presents a choice of color to be applied to the parts of a pattern. The display 9*a* displays the palettes 181, 182, and 183 for the RGB values of the workpiece 101 calculated at step S55 so as to be laterally aligned below parts 152, 162, and 172.

Then, at step S59, the control circuit 61 judges whether it is desired to add any other colors to the palette. The control circuit 61 displays the add key (not illustrated) on the display 9*a*. When user has pressed the touch panel 9*c* disposed above the add key, the touch panel 9*c* detects the pressing of the add key. When the touch panel 9*c* has detected the pressing of the add key, the control circuit 61 judges that the add key has been pressed. The control circuit 61 returns the process flow back to step S53 after judging that the add key has been pressed (S59: YES). The control circuit 61 proceeds to step S61 after judging that the user has pressed an "end palette addition key" (S59: NO).

At step S61, the control circuit 61 accepts selection of one part 152 for which the color is to be changed from the multiple choice of parts, namely 152, 162, and 172 as was the case in step S23. The touch panel 9*c* detects the part that the user has selected from the multiple choice of parts, namely 152, 162, and 172 when the user presses the location of the touch panel 9*c* corresponding to the desired part 152 on the parts screen 132 by a touch pen or the user's finger. The control circuit 61 stores the detected part 152 to the RAM 63.

Then, at step S63, the control circuit 61 accepts selection of one palette 181 from the multiple choice of palettes, namely 181, 182, and 183. The touch panel 9*c* detects the palette 181 that the user has selected from the multiple choice of palettes, namely 181, 182, and 183 when the user presses the location of the touch panel 9*c* corresponding to the desired palette 181 on the parts screen 132 by a touch pen or the user's finger. The control circuit 61 stores the detected palette 181 to the RAM 63.

Then at step S65, the control circuit 61 converts the color of the part selected at step S61 to the color of the palette selected at step S63. The control circuit 61 converts the RGB value stored in the ROM 62 associated with part selected at step S61 to the RGB value of the workpiece 101 corresponding to the color of the palette selected at step S63. For example, the control circuit 61 assigns the RGB value (255, 255, 0) of the workpiece 101 corresponding to color of the palette 181 to the RGB value (255, 0, 0) of the part 152 selected at step S61. As a result, the RGB value of the part 152 is changed to (255, 255, 0).

Then, at step S66, the control circuit 61 displays the pattern 142 on the display 9*c* with the parts colored in the changed colors as was the case in step S31. For example, the display 9*a* displays the pattern 142 including part 152 being colored in RGB value 630 (255, 255, 0) which was changed in step S65.

Then, at step S69, the control circuit 61 judges whether or not "accept combination key" (not illustrated) has been pressed. The touch panel 9*c* detects pressing of the "accept combination key" when the user presses the location of the touch panel 9*c* corresponding to the "accept combination key" on the parts screen 130. When the touch panel 9*c* has detected the pressing of the "accept combination key", the control circuit 61 judges that the "accept combination key" has been pressed. The control circuit 61 terminates the display control program S15B after judging that the "accept combination key" has been pressed on the touch panel 9*c* (S69: YES). The control circuit 61 returns the process flow back to step S61 after judging that the add key has been pressed on the touch panel 9*c* (S69: NO).

Effects of the Second Embodiment

At step S65, the control circuit 61 converts the color of the parts selected by the user into the color selected from multiple palettes which have been read by the scanner 60. At step S66, the control circuit 61 displays the pattern on the display 9*a* with the multiple parts colored in the changed colors. Thus, the user is allowed to display the desired parts of the selected pattern in the colors of the multiple workpieces 101 available to the user. Thus, the user is allowed to be aware of how the combination of parts colored in the colors of the workpieces 101 would look prior to the execution of pattern cutting.

At step S57, the control circuit 61 displays the palettes 181, 182, and 183 one next to another on the display 9*a*. The user is allowed to select a color of the workpiece 101 to be applied to each part by pressing the touch panel 9*c* while viewing the displayed palettes 181, 182, and 183.

[Display Control Program S15C of the Third Embodiment]

Figure 14:
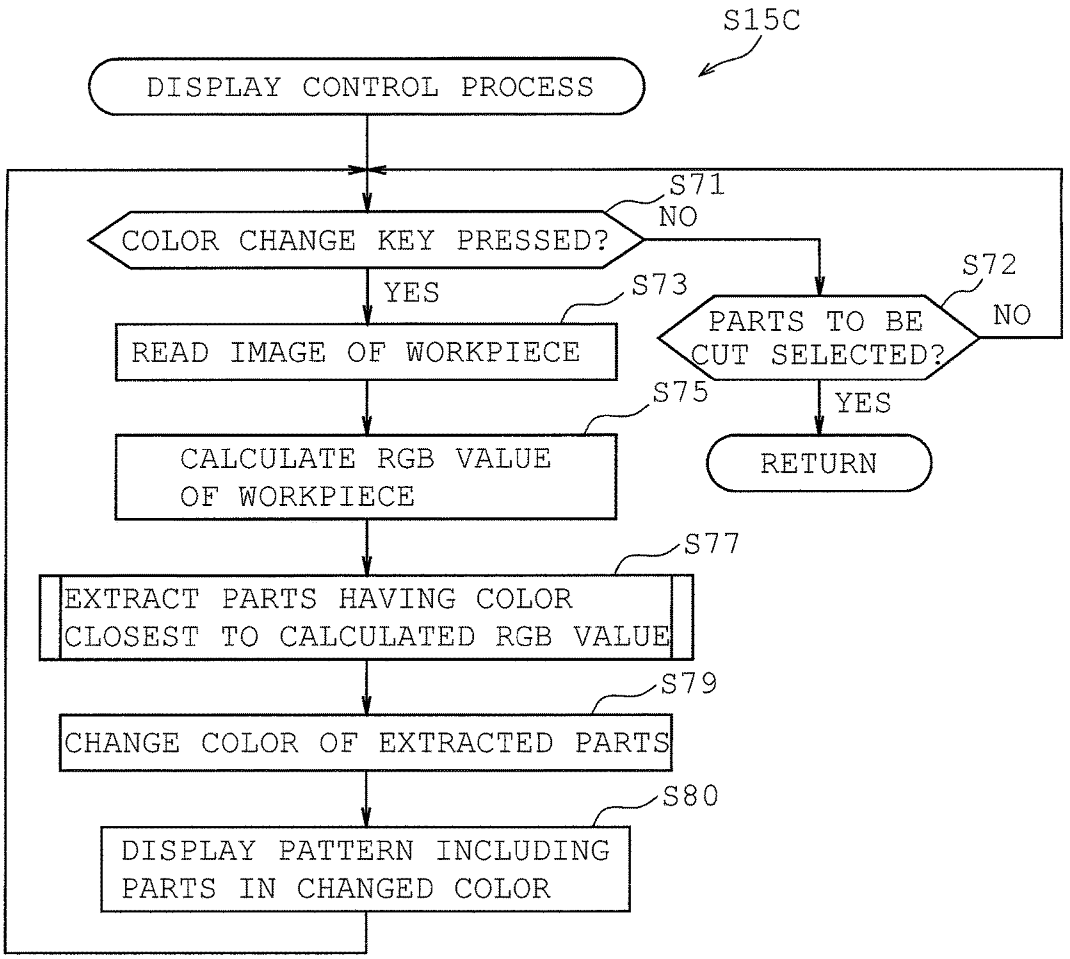
FIG. 14 is a flowchart indicating a process flow of the display control program of step S15C.
Figure 15:
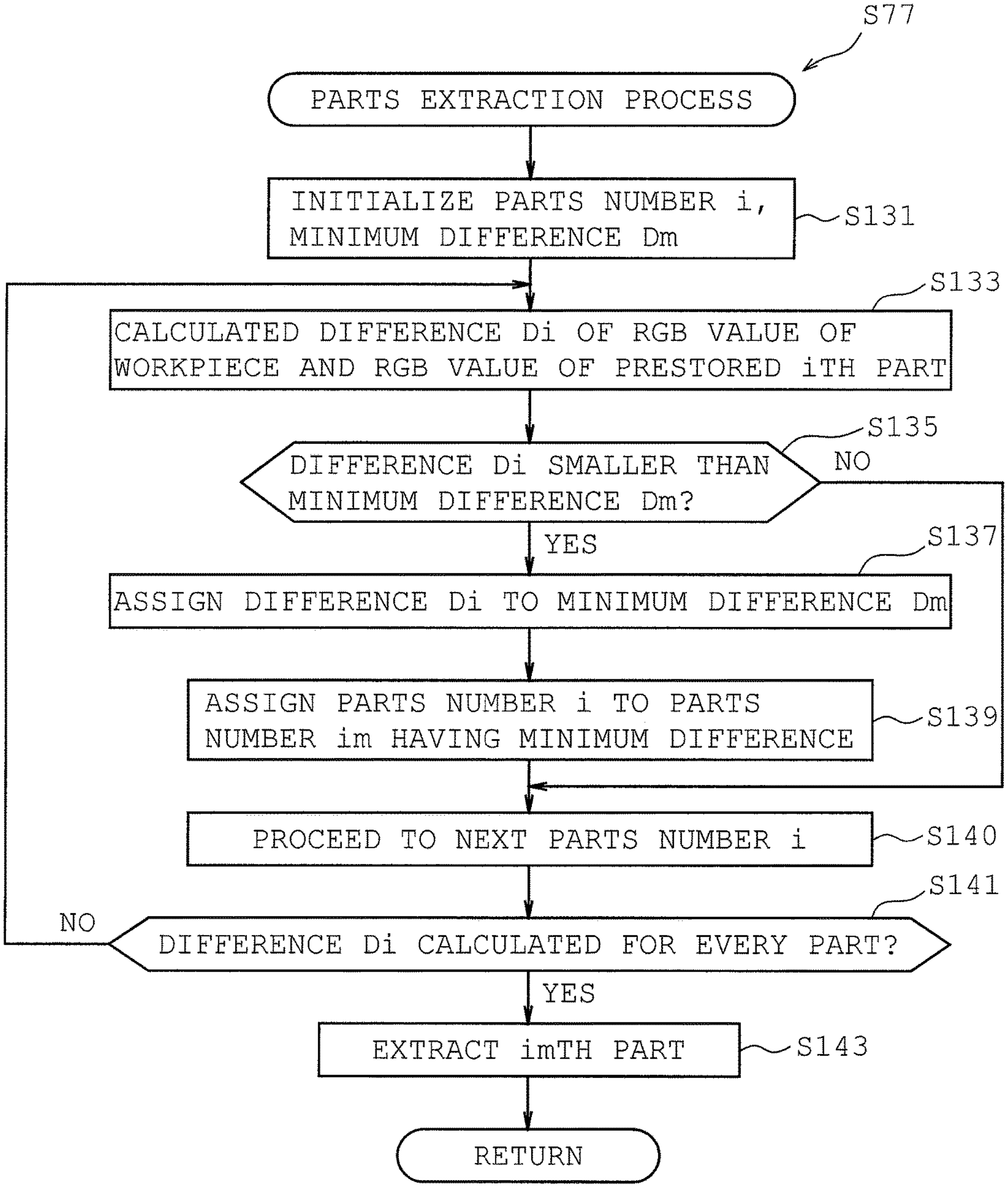
FIG. 15 is a flowchart indicating a process flow of a parts extraction process of step S77.

A description will be given on a display control program S15C of the third embodiment with reference to FIGS. 14 and 15. The third embodiment differs from the first embodiment in that the display control program S15C is provided instead of display control program S15A as illustrated in FIG. 14. The control circuit 61 begins the display control program S15C with step S71 indicated in FIG. 14.

At step S71, the control circuit 61 judges whether or not the color change key has been pressed as was the case in step S21. More specifically, the control circuit 61 displays the color change key (not shown) on the display 9*a*. When user has pressed the touch panel 9*c* disposed above the color change key, the touch panel 9*c* detects the pressing of the color change key. When the touch panel 9*c* has detected the pressing of the color change key, the control circuit 61 judges that the color change key has been pressed. The control circuit 61 proceeds to step S73 after judging that the color change key has been pressed (S71: YES). When the user has pressed a key on the touch panel 9*c* that is different from the color change key, the touch panel 9*c* makes a detection that the color change key has not been pressed. When the touch panel 9*c* has detected that the color change key has not been pressed, the control circuit 61 judges that the color change key has not been pressed. The control circuit 61 proceeds to step S72 after judging that the color change key has not been pressed (S71: NO).

At step S72, the control circuit 61 judges whether or not the parts to be cut have been selected as was the case in step S22. More specifically, the user is to press the parts which the user desires to cut without changing their color on the parts screen 130 in order to start cutting of parts. The control circuit 61 judges that the parts have been selected when the touch panel 9*c* has detected that the parts have been pressed on the parts screen 130. The control circuit 61 terminates the process of step S15C when judging that parts have been selected on the touch panel 9*c* (S72: YES). The control circuit 61 returns the process flow back to step S71 when judging that parts have not been selected on the touch panel 9*c* (S72: NO).

Then, at step S73, the control circuit 61 makes the scanner 60 read an image of the workpiece 101 as was the case in step S25.

Then, at step S75, the control circuit 61 calculates an RGB value, being the color of the workpiece 101, from the image of the workpiece 101 read by the scanner 60 at step S73. RGB value 630 of the workpiece 101 is (250, 0, 0) for example. The control circuit 61 stores RGB value 710 of the workpiece 101 to the RAM 63.

Then, at step S77, the control circuit 61 executes an extraction process that extracts a part having a color most closely approximating the RGB value calculated at step S75.

[Parts Extraction Process S77]

A description will be given on a parts extraction process S77 with reference to FIG. 15. The control circuit 61 begins the parts extraction process S77 with step S131 indicated in FIG. 15.

At step S131, the control circuit 61 initializes the parts number "i" and minimum difference "Dm". More specifically, the control circuit 61 assigns 1 to the parts number i. Further, the control circuit 61 assigns a value to the minimum difference Dm which is greater than the maximum difference 255 2+2552+2552 (=195075) of the colors. One example of such value may be, 200000.

Then, at step S133, the control circuit 61 calculates difference "Di" between the RGB value of the workpiece 101 read by the scanner 60 and the pre-stored RGB value of the ith part. More specifically, when the RGB value of the ith part is (Ri, Gi, Bi) and the RGB value of the workpiece 101 is (R,G,B), the control circuit 61 may obtain the difference Di by the equation difference $Di=(Ri-R)^2+(Gi-G)^2+(Bi-B)^2$. For example, when the RGB value of the first part is (Ri, Gi, Bi)=(255, 0, 0) and the RGB value of the workpiece 101 is (250, 0, 0), the difference Di may be obtained by difference $Di=(R1-R)^2+(G1-G)^2+(B1-B)^2=(255-250)^2+(0-0)^2+(0-0)^2=25$.

At step S135, the differences between the RGB value of the workpiece and RGB values of each of the parts are compared one by one in order to extract the RGB value most closely approximating the RGB value of the workpiece. The control circuit 61 judges whether or not difference Di is less than the minimum difference Dm. The control circuit 61 proceeds to step S137 after judging that difference Di is less than the minimum difference Dm (S135: YES). The control circuit 61 proceeds to step S140 after judging that difference Di is not less than the minimum difference Dm (S135: NO). When the minimum difference Dm=200000 and the difference D1=25, the process flow proceeds to step S137 since minimum difference Dm>difference D1.

At step S137, the control circuit 61 assigns difference Di to minimum difference Dm. The control circuit 61 assigns difference D1=25 to minimum difference Dm=200000 and thus, the minimum difference Dm is updated to 25 (minimum difference Dm=25).

Then, at step S139, the control circuit 61 assigns parts number i to parts number im having the minimum difference. For example, the control circuit 61 assigns parts number i=1 to parts number im and thus, parts number im is updated to 1 (parts number im=1).

Then, at step S140, the control circuit 61 proceeds to the next parts number i and thus, the control circuit 61 increments the parts number i by 1. For example, when the parts number i=1, the control circuit 61 is updated to parts number i=1+1=2.

Then, at step S141, the control circuit 61 judges whether or not difference Di for every part has been calculated. More specifically, parts number "in" is stored in the RAM 63 for every pattern. The control circuit 61 proceeds to step S143 after judging that parts number i is greater than parts number in (S141: YES). The control circuit 61 returns the process flow back to step S133 after judging that parts number i is not greater than parts number in (S141: NO). When parts number i=2 and parts number in=3, the control circuit 61 makes a judgement that the parts number i is not greater than parts number in since parts number i<parts number in.

Then, at step S143, the control circuit 61 extracts the RGB value of the imth part. For example, when im=1, the control circuit 61 extracts the RGB value (R1, G1, B1)=(255, 0, 0) of the first part. After completing step S143, the control circuit 61 terminates the process of step S77 and proceeds to step S79.

At step S79, the control circuit 61 converts the RGB value of the part extracted at step S77 to the RGB value calculated at step S75. More specifically, the control circuit 61 assigns the RGB value 710 of the workpiece calculated at S75 to the RGB value 630 of the part extracted at step S77 which is pre-stored in the ROM 62. For example, (250, 0, 0) is assigned to the RGB value 630 (255, 0, 0) of parts 150 indicated in FIG. 8 most closely approximating the RGB value 710 (250, 0, 0) of the workpiece 101.

At step S80, the control circuit 61 displays the pattern containing multiple parts whose colors were changed at step S79 on the display 9*a*. More specifically, the control circuit 61 invokes the parts screen 131 presenting the pattern in changed colors on the display 9*a*. For example, the display 9*a* displays part 151 which has been changed to a slightly bright color represented by RGB value 630 (250, 0, 0). After completing step S80, then control circuit 61 returns the process flow back to S71.

Effects of Third Embodiment

At step S77, the control circuit 61 extracts the part most closely approximating the color read by the scanner 60. As a result, cutting apparatus 1 automatically changes the color of a part to a color most closely approximating the color read by the scanner 60 without requiring the user to select the part for which the color is to be changed. Thus, the user is allowed to view the most appropriate combination of parts without requiring the user to select the parts.

[Display Control Program S15D of Fourth Embodiment]

Figure 16:
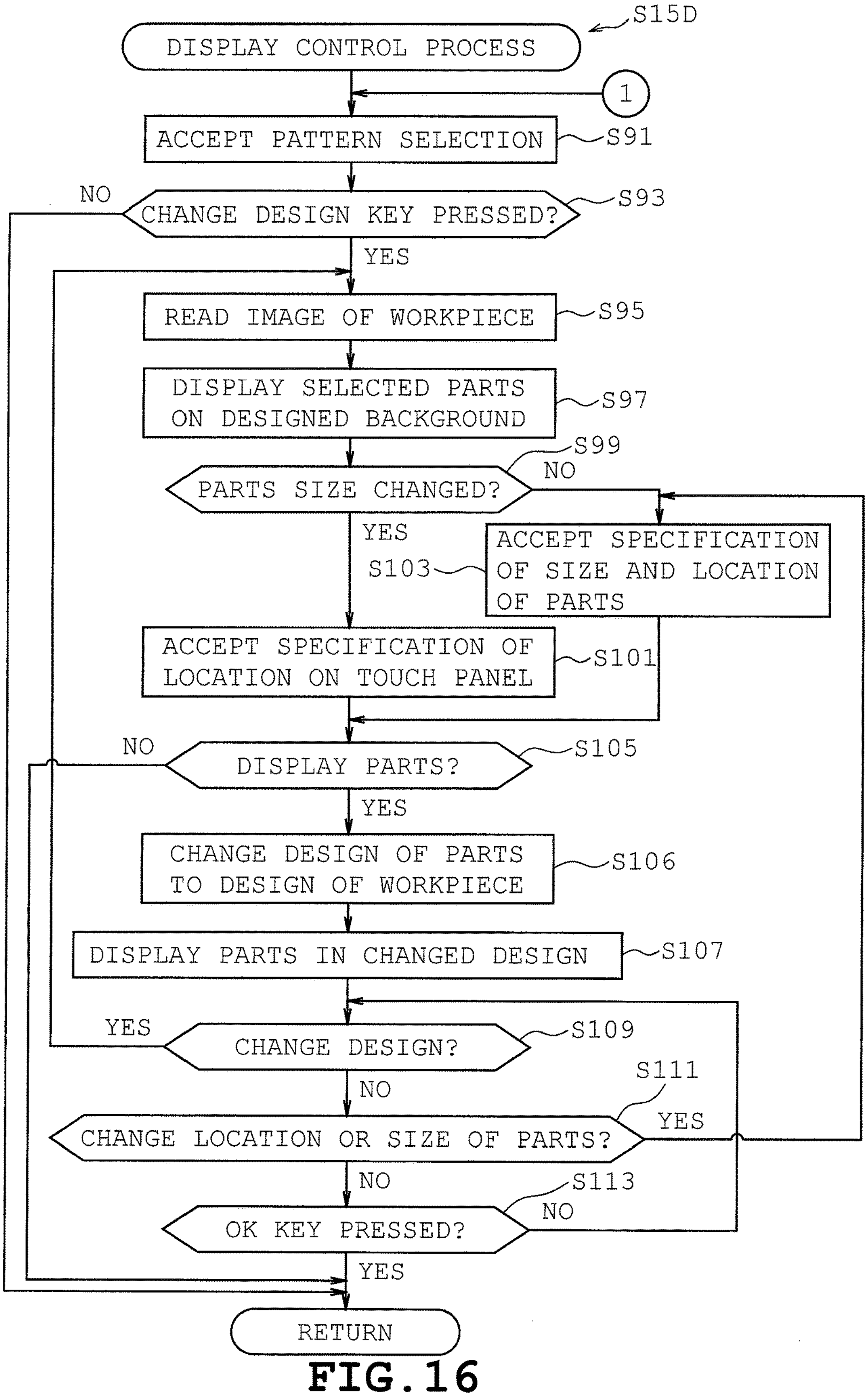
FIG. 16 is a flowchart indicating a process flow of the display control program of step S15D.

A description will be given on a display control program S15D of the fourth embodiment with reference to FIGS. 16 and 19. The fourth embodiment differs from the first embodiment in that the display control program S15D is provided instead of display control program S15A as illustrated in FIG. 16. The control circuit 61 begins the display control program S15D with step S91 indicated in FIG. 16.

Figure 17:
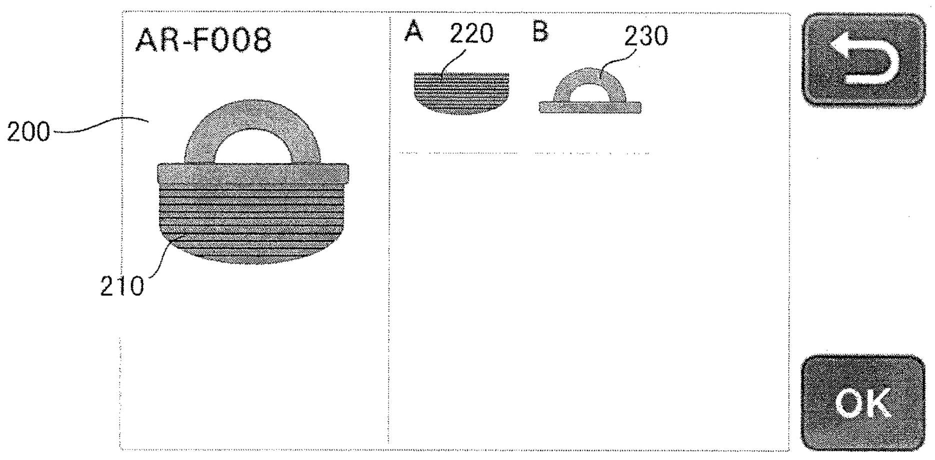
FIG. 17 illustrates a parts screen 200.

At step S91, the control circuit 61 accepts selection of one part 220 from the multiple choice of parts, namely 220 and 230 illustrated in FIG. 17. For example, suppose that the touch panel 9*c* has detected that the user has selected part 220 illustrated in FIG. 17. The control circuit 61 stores the detected part 220 to the RAM 63.

At step S93, the control circuit 61 judges whether or not a change is to be made on the design. More specifically, the control circuit 61 judges whether or not a design change key has been pressed. The control circuit 61 displays the design change key (not shown) on the display 9*a*. When user has pressed the touch panel 9*c* disposed above the design change key, the touch panel 9*c* detects the pressing of the design change key. When the touch panel 9*c* has detected the pressing of the design change key, the control circuit 61 judges that the design change key has been pressed. The control circuit 61 proceeds to step S95 after judging that the design change key has been pressed (S93: YES). When the user has pressed a key on the touch panel 9*c* that is different from the design change key, the touch panel 9*c* makes a detection that the design change key has not been pressed. When the touch panel 9*c* has detected that the design change key has not been pressed, the control circuit 61 judges that the design change key has not been pressed. The control circuit 61 terminates step S15D after judging that the design change key has not been pressed (S93: NO).

At step S95, the control circuit 61 reads an image 310 of the workpiece 101 using the scanner 60 as was the case in step S25.

Figure 18:
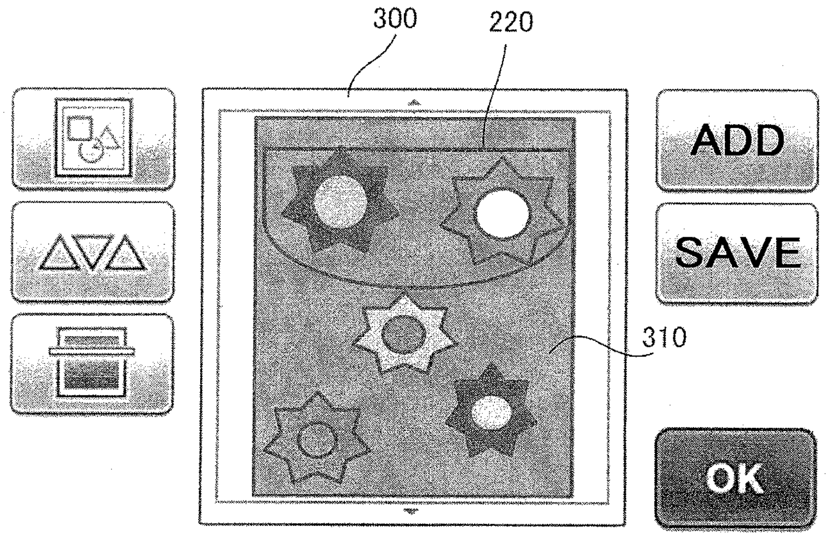
FIG. 18 illustrates a parts locationing screen 300.

At step S97, the control circuit 60 displays the part 220 selected at step S91 on the display 9*a* using the image 310 of the design of the workpiece 101 read at step S95 as the background as illustrated in FIG. 18.

At step S99, control circuit 60 judges whether or not the size 650 of one of the parts among the selected parts have been changed in order to uniform the size of the parts. More specifically, the control circuit 61 judges whether the default size 650 of the part pre-stored in the ROM 62 is identical to the size 650 of the part once changed and stored in the RAM 63. The control circuit 61 proceeds to step S101 after judging that the sizes 650 of the part are not identical (step S99: YES). The control circuit 61 proceeds to step S103 after judging that the sizes 650 of the parts are identical (step S99: NO).

At step S101, the control circuit 61 accepts specification of the layout of the part selected at step S91 on the design 310 of the workpiece 101 read by the scanner 60. More specifically, the control circuit 61 accepts specification of the location of the part through the touch panel 9*c*. The user is to specify the location where the user wishes to place the part on the design 310 displayed on the display 9*a* by pressing the desired location on the touch panel 9*c*. The control circuit 61 identifies the central coordinate of the part at the location specified by the user and stores the coordinate in the RAM 63.

At step S103, the control circuit 61 accepts specification of the size 650 of the part through the touch panel 9*c*. The control circuit 61 stores the specified size 650 of the part in the RAM 63. The control circuit 61 accepts specification of the layout of the part selected at step S91 on the design 310 of the workpiece 101 read by the scanner 60. More specifically, the control circuit 61 accepts specification of the location of the part through the touch panel 9*c*. The user is to specify the location where the user wishes to place the part on the design 310 displayed on the display 9*a* by pressing the desired location on the touch panel 9*c* with the user's finger. The control circuit 61 identifies the central coordinate of the part at the location where the user released the pressure applied to the touch panel 9*c* with the user's finger and stores the identified central coordinate in the RAM 63 as location 640 of the RAM 63.

Then, at step S105, the control circuit 61 judges whether or not to invoke the parts screen. The control circuit 61 displays a preview key (not shown) on the display 9*a*. When user has pressed the touch panel 9*c* disposed above the preview key, the touch panel 9*c* detects the pressing of the preview key. When the touch panel 9*c* has detected the pressing of the preview key, the control circuit 61 judges that the preview key has been pressed. The control circuit 61 proceeds to step S106 after judging that the preview key has been pressed (S105: YES). The control circuit 61 terminates step S15D after judging that the cut key has been pressed on the touch panel 9*c* (S105: NO).

Next, at step S106, the control circuit 61 converts the design of the part selected at step S91 into the design laid out according to the specification made at step S101 or 103. The control circuit 61 generates the coordinate data indicating the locations where the cuts are to be made based on the shape 620 of the parts, the location 640 of the parts, and the size 650 of the parts. The control circuit 61 stores an image 310 of the area inside the boundary defined by the locations where the cuts are to be made in the RAM 63. The control circuit 61 stores the coordinate data indicating the locations where the cuts are to be made in the RAM 63 as cut data 720.

Figure 19:
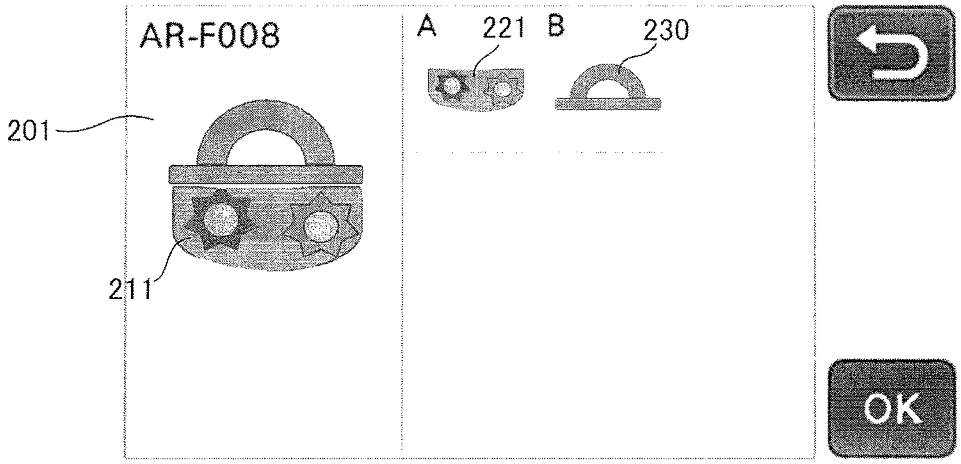
FIG. 19 illustrates a parts screen 201 in which designs have been changed.

Then, at step S107, the control circuit 61 invokes the parts screen 201 illustrated in FIG. 19 on the display 9*a*. The control circuit 61 reads the image 310 of the region inside the boundary defined by the locations of where the part 220 is to be cut from the RAM 63 and displays pattern 211 on the display 9*a* with the design of the part 221 changed to the image 310 of the region inside the boundary.

At step S109, the control circuit 61 judges whether or not to change the design 310 of the workpiece 101. More specifically, the control circuit 61 displays the design change key (not illustrated) on the display 9*a* and judges whether or not the design change key has been pressed on the touch panel 9*c*. The control circuit 61 returns the process flow to step S95 after judging that the design change key has been pressed (step S109: YES). The control circuit 61 proceeds to step S111 after determining that the design change key has not been pressed (S109: NO).

At step S111, the control circuit 61 judges whether or not to change the location or the size of the parts. More specifically, the control circuit 61 displays a location•size change key (not illustrated) on the display 9*a* and judges whether or not the location•size key has been pressed on the touch panel 9*c*. The control circuit 61 returns the process flow back to step S103 after judging that the location•size key has been pressed (S111: YES). The control circuit 61 proceeds to step S113 after judging that the location•size key has not been pressed (S111: NO).

At step S113, the control circuit 61 determines whether or not an OK key has been pressed. The control circuit 61 displays the OK key (not illustrated) on the display 9*a* and determines whether or not the OK key has been pressed (S113: YES) on the touch panel 9*c*. The control circuit 61 terminates the display control program step S15D after judging that the OK key has been pressed. The control circuit 61 returns the process flow back to step S109 after judging that the OK key has not been pressed (step S113: NO).

Figure 20:
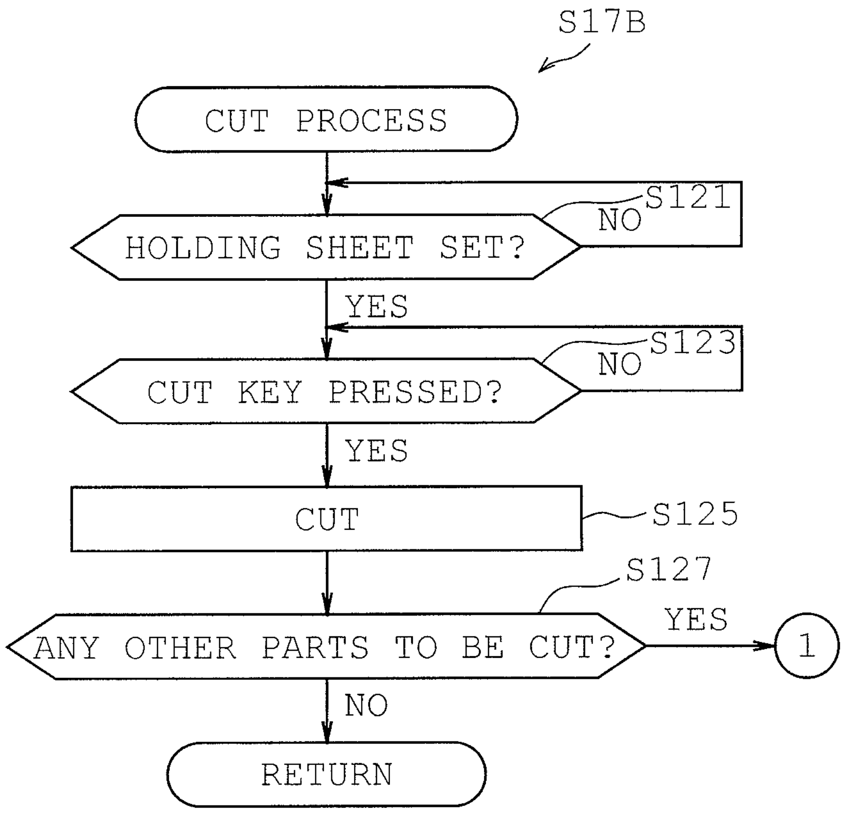
FIG. 20 is a flow chart indicating a process flow of the cut process of step S17B.

Referring next to FIG. 20, a description will be given in detail on a cut process step S17B. The control circuit 61 begins the cut process step S17B with step S121 indicated in FIG. 20.

At step S121 the control circuit 61 determines whether or not the holding sheet 10 has been set. The control circuit 61 proceeds to step S123 after judging that the holding sheet 10 has been set (S121: YES). The control circuit 61 repeats step S121 after judging that the holding sheet 10 has not been set (S121: NO).

At step S123, the control circuit 61 judges whether or not the cut key has been pressed. More specifically, the control circuit 61 judges that the cut key has been pressed when the touch panel 9*c* has detected that the cut has been pressed. The control circuit 61 proceeds to step S125 after judging that the cut key has been pressed (S123: YES). The control circuit 61 repeats step S123 after judging that the cut key has not been pressed (S123: NO).

At step S125, the control unit 61 controls the movement of the transfer unit 20 so that the part selected at step S91 is cut. More specifically, the control circuit 61 reads the cut data 720 from the RAM 63 and controls the drive of the transfer unit 20 so that the blade tip 6*a* is moved along the coordinates defined in the cut data 720.

Then, at step S127, the control circuit 61 judges whether there any other parts to be cut. The control circuit 61 returns the process flow back to step S91 of FIG. 16 when detecting that a "next part" key has been pressed (S127: YES). The control circuit 61 terminates the cut process 17B after detecting that an "END" key has been pressed on the touch panel 9*c* (S127: NO).

The control circuit 61 terminates the cut control program 500 after terminating the cut process S17B.

Effects of the Fourth Embodiment

At step S97, the display 9*a* displays the parts on the design read by the scanner 60. At step S107, the display 9*a* displays the combination of parts after changing the design of the locations specified by the user to the designs of the parts. Thus, it is possible to facilitate the user in coordinating the design of the parts.

Modified Embodiments

The present disclosure is not limited to the embodiment described above but may be implemented in various other embodiments within the spirit of the disclosure.

At step S25, the scanner 60 is configured to read the image of the entire surface of the workpiece 101 placed on the holding sheet 10 and at step S27, the control circuit 61 is configured to calculate the RGB value based on the image of the entire surface of the workpiece 101. Alternatively, the scanner 60 may be configured to read a part of the image of the surface of the workpiece 101 placed on the holding sheet 10 when calculating the colors. For example, the scanner 60 may be configured to read a predetermined number of lines, such as 10 lines, on the image. The control circuit 61 may be configured to calculate the average of the RGB values from the pixels of image of the predetermined number of lines. It is thus, possible to reduce the duration of the process for calculating the color of the workpiece 101.

In the above described embodiments, the workpiece 101 was attached to the entire surface of the area of the holding sheet 10 being read by the scanner 60. However, the workpiece 101 may be attached to only a portion of the area of the workpiece being read by the scanner 60. In such case, the scanner 60 may read the entire surface of the area read by the holding sheet 10. Then, the control circuit 61 may calculate the outline of the workpiece 101 by executing a known outline extraction process for extracting outlines from the read image. The control circuit 61 may thereafter calculate the average RGB value of the inner region of the outline of the workpiece 101 as the RGB value of the workpiece 101.

At step S77, the control circuit 61 is configured to calculate the square sum of the difference of the RGB values calculated at step S75 ($Di=(Ri-R)^2+(Gi-G)^2+(Bi-B)^2$), and extract the part that has the smallest square sum Di as the most closely approximating color. Alternatively, the control circuit 61 may be configured to extract the most closely approximating color by using HSV values and Lab values instead of RGB values. For example, the control circuit 61 may be configured to calculate the HSV value using known calculation methods as disclosed in JP 2014-50632 A.

HSV stands for Hue, Saturation, and Value. Hue H indicates the type of color such as red, purple, and blue, and is represented by a numerical range of 0 to 360 for example. Saturation S indicates the vividness of the color and is represented by a numerical range of 0.0 to 1.0 for example. Value V indicates the brightness of the color and is represented by a numerical range of 0.0 to 1.0 for example.

A description will be given in detail on how the color most closely approximating the color read by the scanner 60 may be extracted. The control circuit 61 calculates the color phase H based on the RGB value read by the scanner 60. The control circuit 61 calculates the color phase Hi from the RGB value of the ith part. Then, the control circuit 61 calculates difference Hm=color phase Hi-color phase H. The control circuit 61 may be configured to calculate difference Hm in a similar manner for other parts. The control circuit 61 may extract the color most closely approximating the color read by the scanner 60 by extracting the part having the smallest difference Hm.

Further, the control circuit 61 may be configured to calculate the Lab value based on a known calculation method as disclosed in the method of JP H11-57262 A. The Lab value is based on the Lab color space specified by CIE (Commission internationale de l'éclairage)

A description will be given in detail on how the color most closely approximating the color read by the scanner 60 is extracted using the Lab color space. The control circuit 61 calculates the Lab color space based on the RGB values read by the scanner 60 using a known calculation method. The control circuit 61 calculates the color space Liaibi based on the RGB value of the ith part. Then, the control circuit 61 calculates distance$=(Li-L)^2+(ai-a)^2+(bi-b)^2$ in the Lab color space.

The control circuit 61 may be configured to calculate the distance in a similar manner for other parts. The control circuit 61 may extract the color most closely approximating the color read by the scanner 60 by extracting the part having the smallest distance.

The transfer unit 20 is configured to cut the workpiece 101 into a desired shape by transferring the cutting blade 6 in the X direction by the transfer mechanism 8 and transferring the workpiece 101 in the Y direction by the feed mechanism 7. Alternatively, the transfer unit may be configured to cut the workpiece 101 by moving the cutting blade 6 in two directions, namely the X- and the Y-directions without moving the workpiece 101.

The control circuit 61 is capable of changing the color of the design of a part by reading the color or the design of the workpiece 101 with the scanner 60. However, the control circuit 61 may be configured to read the color or the design of the workpiece 101 using a camera as is the case in the patent JP H01-250465 A.

The display control programs S15A, S15B, S15C, and S15D may be stored in a computer readable storing medium such as a hard disk, a flexible disc, a CD-ROM, a DVD or the like. In such case, the computer readable storing medium may be read and executed through a computer such a personal computer. Further, the display control programs S15A, S15B, S15C, and S15D may be a transmission medium which is capable of being distributed over a network such as the internet.

The cutting apparatus 1 is one example of a cutting apparatus.

The cutting apparatus 1 is one example of a display control device.

The cut control program 500 is one example of a cut control program.

The ROM 62 is one example of a storing unit.

The pattern data 600 is one example of a pattern.

The scanner 60 is one example of an acquiring unit.

Steps S29, S65, S79, and S106 are examples of a changing process.

Steps S29, S65, S79, and S106 are examples of a change processing unit.

Steps S25, S53, S73, and S95 are examples of an acquisition control process.

Steps S25, S53, S73, and S95 are examples of an acquisition control unit.

Step S31, S66, S80, and S107 are examples of a display control process.

The control circuit 61 configured to execute step S31, S66, S80, and S107 is one example of a display control unit.

Display 9*a* is one example of a display unit.

Step S23 is one example of a first accepting process.

The control circuit 61 configured to execute step S23 is one example of a first accepting unit.

Step S63 is one example of a second accepting process.

The control circuit 61 configured to execute step S63 is one example of a second accepting unit.

Step S101 or step S103 is one example of a third accepting process.

The control circuit 61 configured to execute step S101 or step S103 is one example of a third accepting unit.

Step S77 is one example of an extraction process.

The control circuit 61 configured to execute step S77 is one example of an extraction unit.

Step S47 is one example of a transfer process.

The transfer unit 20 is one example of a transfer unit.

The control circuit 61 configured to execute steps S15A, S15B, S15C, and S15D are examples of a display control program.

In the embodiments described above, a single CPU may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

The foregoing description and drawings are merely illustrative of the principles of the disclosure and are not to be construed in a limited sense. Various changes and modifications will become apparent to those of ordinary skill in the art. All such changes and modifications are seen to fall within the scope of the disclosure as defined by the appended claims.

We claim:

1. A cutting apparatus comprising:

an acquiring unit configured to optically read a color or a design on a surface of at least one workpiece;

a storing unit configured to store data of a pattern having plural parts of different colors or designs;

a changing unit configured to change a color or a design of at least one part of a pattern in the data stored in the storing unit to the color or the design optically read by the acquiring unit for the at least one workpiece; and a display unit configured to display the pattern having the at least one part in which the color or the design has been changed by the changing unit to the color or the design of the at least one workpiece.

2. The cutting apparatus according to claim 1, further comprising a first accepting unit configured to accept selection of one part from plural parts of a pattern, and wherein a color or a design of the one part accepted by the first accepting unit is changed by the changing unit to the color or the design optically read by the acquiring unit for the at least one workpiece.

3. The cutting apparatus according to claim 1, further comprising a second accepting unit, wherein when colors or designs of plural workpieces have been optically read by the acquiring unit, the second accepting unit is configured to accept selection of one color or one design from the colors or the designs optically read by the acquiring unit for the plural workpieces, and wherein a color or a design of at least one part of a pattern in the data stored in the storing unit is changed by the changing unit to the one color or the one design accepted by the second accepting unit.

4. The cutting apparatus according to claim 3, wherein the colors or the designs optically read for the plural workpieces are displayed so as to be located one next to another on the display unit.

5. The cutting apparatus according to claim 1, further comprising an extracting unit configured to extract, from plural parts of a pattern in the data stored in the storing unit, a part having a color most closely approximating the color optically read by the acquiring unit for the at least one workpiece, and wherein a color of the part extracted by the extracting unit is changed by the changing unit to the color optically read by the acquiring unit for the at least one workpiece.

6. The cutting apparatus according to claim 1, further comprising a third accepting unit that, when the design of the at least one workpiece has been optically read by the acquiring unit, is configured to accept specification of a location on the at least one workpiece optically read, and wherein the design of the at least one part of the pattern in the data stored in the storing unit is changed by the changing unit to the design of the at least one workpiece encompassed in the location specified.

7. The cutting apparatus according to claim 1, wherein the acquiring unit comprises a scanner.

8. The cutting apparatus according to claim 1, further comprising cutting blade and a transfer unit, wherein the transfer unit is configured to transfer the cutting blade and the workpiece relative to one another so that the cutting blade cuts each part of a pattern from the workpiece.

9. The cutting apparatus according to claim 1, wherein the pattern having the at least one part in which the color or the design has been changed and plural parts constituting the pattern including the at least one part in which the color of the design has been changed are displayed on the same screen invoked on the display unit.

10. A non-transitory computer readable storing medium, storing computer readable instructions that instruct a cutting apparatus provided with a storing unit and a display unit to:

optically read a color or a design on a surface of at least one workpiece;

change a color or a design of at least one part of a pattern in data stored in the storing unit to the color or the design optically read for the at least one workpiece; and display a pattern having the at least one part in which the color or the design has been changed to the color or the design of the at least one workpiece on the display unit.

11. The medium according to claim 10, wherein the instructions further instruct the cutting apparatus to accept selection of one part from plural parts of a pattern, and wherein a color or a design of the one part accepted is changed to the color or the design optically read for the at least one workpiece.

12. The medium according to claim 10, wherein the instructions further instruct the cutting apparatus to, when colors or designs of plural workpieces have been optically read, accept selection of one color or one design from the colors or the designs optically read for the plural workpieces, and wherein a color or a design of at least one part of a pattern in the data stored in the storing unit is changed to the one color or the one design accepted.

13. The medium according to claim 11, wherein the instructions further instruct the cutting apparatus to, when colors or designs of plural workpieces have been optically read, display the colors or the designs optically read for the plural workpieces so as to be located one next to another on the display unit.

14. The medium according to claim 10, wherein the instructions further instruct the cutting apparatus to extract, from plural parts of a pattern in the data stored in the storing unit, a part having a color most closely approximating the color optically read for the at least one workpiece, and wherein a color of the part extracted is changed to the color optically read for the at least one workpiece.

15. The medium according to claim 10, wherein the instructions further instruct the cutting apparatus to, when the design of the at least one workpiece has been optically read, accept specification of a location on the at least one workpiece optically read, and wherein the design of the at least one part of the pattern in the data stored in the storing unit is changed to the design of the at least one workpiece encompassed in the location specified.

16. The medium according to claim 10, wherein the color or the design of the at least one workpiece is optically read by a scanner.

17. The medium according to claim 10, wherein the cutting apparatus is further provided with a cutting blade and a transfer unit, wherein the instructions further instruct the cutting apparatus to operate the transfer unit to transfer the cutting blade and the workpiece relative to one another so that the cutting blade cuts each part of a pattern from the workpiece.

18. The medium according to claim 10, wherein the pattern having the at least one part in which the color or the design has been changed and plural parts constituting the pattern including the at least one part in which the color of the design has been changed are displayed on the same screen invoked on the display unit.

19. A display control device comprising:

an acquiring controller configured to cause an acquiring unit to optically read a color or design on a surface of at least one workpiece;

a changing unit configured to change a color or a design of plural parts of a pattern in data stored in a storing unit to the color or the design of the at least one workpiece caused to be optically read by the acquiring unit by the acquiring controller; and a display controller configured to display the pattern having plural parts in which the color or the design has been changed to the color or design of the at least one workpiece on the display unit.

* * * * *